US011356581B2

(12) United States Patent
Kasahara et al.

(10) Patent No.: US 11,356,581 B2
(45) Date of Patent: Jun. 7, 2022

(54) APPARATUS AND IMAGE FORMING METHOD FOR PERFORMING GRADATION CORRECTION ON AN IMAGE USING GENERATED GRADATION CORRECTION DATA

(71) Applicant: CANON KABUSHIKI KAISHA, Tokyo (JP)

(72) Inventors: Aya Kasahara, Tokyo (JP); Masaki Kashiwagi, Kanagawa (JP); Junichi Mori, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/122,924

(22) Filed: Dec. 15, 2020

(65) Prior Publication Data

US 2021/0203810 A1 Jul. 1, 2021

(30) Foreign Application Priority Data

Dec. 25, 2019 (JP) ............................. JP2019-235093

(51) Int. Cl.

*H04N 1/60* (2006.01)
*H04N 1/00* (2006.01)
*H04N 1/54* (2006.01)
*H04N 1/407* (2006.01)

(52) U.S. Cl.

CPC ....... *H04N 1/6055* (2013.01); *H04N 1/00045* (2013.01); *H04N 1/4078* (2013.01); *H04N 1/54* (2013.01)

(58) Field of Classification Search

None

See application file for complete search history.

(56) References Cited

U.S. PATENT DOCUMENTS

2006/0152776 A1* 7/2006 Bailey .................. H04N 1/6055 358/504
2015/0350484 A1* 12/2015 Suzuki ..................... H04N 1/38 358/474
2019/0268502 A1* 8/2019 Shirasawa ............ H04N 1/6027

FOREIGN PATENT DOCUMENTS

JP 2017032922 A 2/2017

* cited by examiner

*Primary Examiner* — Barbara D Reinier

(74) *Attorney, Agent, or Firm* — Canon U.S.A., Inc. IP Division

(57) ABSTRACT

On a recording sheet of a first size, an image combined with gradation patches of a plurality of colors is printed, on a recording sheet of a second size smaller than the first size, images combined with the gradation patches of the plurality of colors are divided and printed into a plurality of recording sheets, color measurement is performed on each of the gradation patches, and gradation correction data is generated.

15 Claims, 18 Drawing Sheets

| REFERENCE VALUE | | | | | | | | | | |
|---|---|---|---|---|---|---|---|---|---|---|
| TEMPERATURE | 100 | 90 | 80 | 70 | 60 | 50 | 40 | 30 | 20 | 10 |
| C | 1022 | 922 | 819 | 717 | 617 | 512 | 405 | 307 | 205 | 102 |
| M | 1020 | 923 | 820 | 717 | 615 | 513 | 412 | 309 | 210 | 103 |
| Y | 1016 | 921 | 819 | 717 | 614 | 512 | 410 | 305 | 205 | 99 |
| K | 1023 | 920 | 820 | 713 | 611 | 510 | 408 | 307 | 207 | 100 |

882

| MEASURED VALUE | | | | | | | | | | |
|---|---|---|---|---|---|---|---|---|---|---|
| TEMPERATURE | 100 | 90 | 80 | 70 | 60 | 50 | 40 | 30 | 20 | 10 |
| C | 1018 | 921 | 822 | 719 | 620 | 520 | 401 | 307 | 203 | 100 |
| M | 1010 | 920 | 815 | 723 | 615 | 523 | 422 | 311 | 214 | 100 |
| Y | 1005 | 923 | 824 | 710 | 619 | 512 | 411 | 309 | 207 | 110 |
| K | 1020 | 915 | 815 | 700 | 601 | 512 | 405 | 302 | 205 | 95 |

883

| CORRECTION VALUE | | | | | | | | | | |
|---|---|---|---|---|---|---|---|---|---|---|
| TEMPERATURE | 100 | 90 | 80 | 70 | 60 | 50 | 40 | 30 | 20 | 10 |
| C | 4 | 1 | -3 | -2 | -3 | -8 | 4 | 0 | 2 | 2 |
| M | 10 | 3 | 5 | -6 | 0 | -10 | -10 | -2 | -4 | 3 |
| Y | 11 | -2 | -5 | 7 | -5 | 0 | -1 | -4 | -2 | -11 |
| K | 3 | 5 | 5 | 13 | 10 | -2 | 3 | 5 | 2 | 5 |

FIG.8D

| 891 SHEET TYPE | 892 TARGET SHEET FEEDING STAGE | 893 REFERENCE VALUE (1/2-SPEED) | 894 REFERENCE VALUE (1/1-SPEED) | 895 GENERATION PAGE ID | 896 TIMESTAMP |
|---|---|---|---|---|---|
| PLAIN PAPER 3 | CST1 | NULL | PRESENT TBL 881 | 60014 | 2019/07/18 10:04:06 |
| COATED PAPER 1 | CST4 | NULL | NULL | NULL | NULL |
| | | | | | |

FIG.8E

| SHEET TYPE | 897 TARGET SHEET FEEDING STAGE | 898 CORRECTION VALUE (1/2-SPEED) | 899 CORRECTION VALUE (1/1-SPEED) | GENERATION PAGE ID | TIMESTAMP |
|---|---|---|---|---|---|
| PLAIN PAPER 3 | CST1 | NULL | PRESENT TBL 883 | 640015 | 2019/07/18 18:34:21 |
| COATED PAPER 1 | CST4 | NULL | NULL | NULL | NULL |
| | | | | | |

FIG.10

| SHEET SIZE | FEEDING DIRECTION (mm) | WIDTH DIRECTION (mm) | DIVIDE OR NOT |
|---|---|---|---|
| A3 | 420.0 | 297.0 | NOT DIVIDE |
| B4 | 364.0 | 257.0 | NOT DIVIDE |
| A4R | 297.0 | 210.0 | NOT DIVIDE |
| A4 | 210.0 | 297.0 | DIVIDE |
| B5R | 257.0 | 182.0 | NOT DIVIDE |
| B5 | 182.0 | 257.0 | DIVIDE |
| A5R | 210.0 | 148.0 | DIVIDE |
| 11×17 | 431.8 | 279.4 | NOT DIVIDE |
| LGL | 355.6 | 215.9 | NOT DIVIDE |
| LTR | 215.9 | 279.4 | DIVIDE |
| LTRR | 279.4 | 215.9 | NOT DIVIDE |
| STMTR | 215.9 | 139.7 | DIVIDE |
| SRA3 | 450.0 | 320.0 | NOT DIVIDE |
| 12×18 | 457.2 | 304.8 | NOT DIVIDE |
| EXEC | 184.1 | 266.7 | DIVIDE |
| EXEC-R | 266.7 | 184.1 | NOT DIVIDE |
| 13×19 | 482.6 | 330.2 | NOT DIVIDE |

FIG.12A

| SHEET TYPE |
| --- |
| PLAIN PAPER |

FIG.12B

| SHEET TYPE | PATCH INTERVAL COUNTER |
| --- | --- |
| PLAIN PAPER | 1 |
| HIGH-QUALITY PAPER | 7 |
| COATED PAPER | 30 |
| | |

APPARATUS AND IMAGE FORMING METHOD FOR PERFORMING GRADATION CORRECTION ON AN IMAGE USING GENERATED GRADATION CORRECTION DATA

BACKGROUND OF THE DISCLOSURE

Field of the Disclosure

The aspect of the embodiments relates to an apparatus and an image forming method.

Description of the Related Art

There have been printing systems including a sensor at a stage subsequent to an image forming apparatus for forming an image on a sheet and causing the sensor to read the image formed on the sheet by the image forming apparatus. In such printing systems, a sensor reads patches for image quality adjustment printed in the margin of an output product and the color measurement values obtained by the reading are fed back to an image forming apparatus in real time.

Since the margin of an output product has a limited area, the image forming apparatus may not be able to accurately apply patches required for adjustment. Japanese Patent Application Laid-Open No. 2017-32922 discusses a method for, in a case where patches for image forming position adjustment and patches for image quality adjustment are to be simultaneously printed but the patches can overlap each other, reducing the number of gradation levels of the patches for image quality adjustment to prevent the patches from overlapping each other and printing the patches.

In Japanese Patent Application Laid-Open No. 2017-32922, however, the reduction in the number of gradation levels of the patches for image quality adjustment leads to decrease in accuracy of image quality adjustment in comparison with image quality adjustment using the patches of a case where the patches do not overlapping each other.

SUMMARY OF THE INVENTION

According to an aspect of the embodiments, an apparatus includes a control unit configured to control a printing unit to print an image combined with gradation patches of a plurality of colors for gradation correction on a recording sheet of a first size, and configured to control the printing unit to print an image combined with gradation patches of fewer colors than the plurality of colors on a recording sheet of a second size smaller than the first size, a measurement unit configured to read each of the gradation patches printed on the recording sheet and perform color measurement on the gradation patches, a generation unit configured to generate gradation correction data of each of the plurality of colors based on a value obtained by the color measurement, and a correction unit configured to perform gradation correction on the image, using the generated gradation correction data, wherein, for the recording sheet of the second size, the control unit divides and prints the gradation patches of the plurality of colors into a plurality of recording sheets.

Further features of the disclosure will become apparent from the following description of exemplary embodiments with reference to the attached drawings.

BRIEF DESCRIPTION OF THE DRAWINGS

FIG. 8C is a diagram illustrating examples of reference values, measured values, and correction values.

FIG. 8D is a management table for reference values for gradation correction.

FIG. 8E is a management table for correction values.

FIG. 10 is a diagram illustrating a summary of whether or not to divide patches for each sheet size.

FIG. 12A is a diagram illustrating waiting-for-second-sheet information according to the first exemplary embodiment.

FIG. 12B is a diagram illustrating waiting-for-second-sheet information according to a second exemplary embodiment.

DESCRIPTION OF THE EMBODIMENTS

Figure 1:
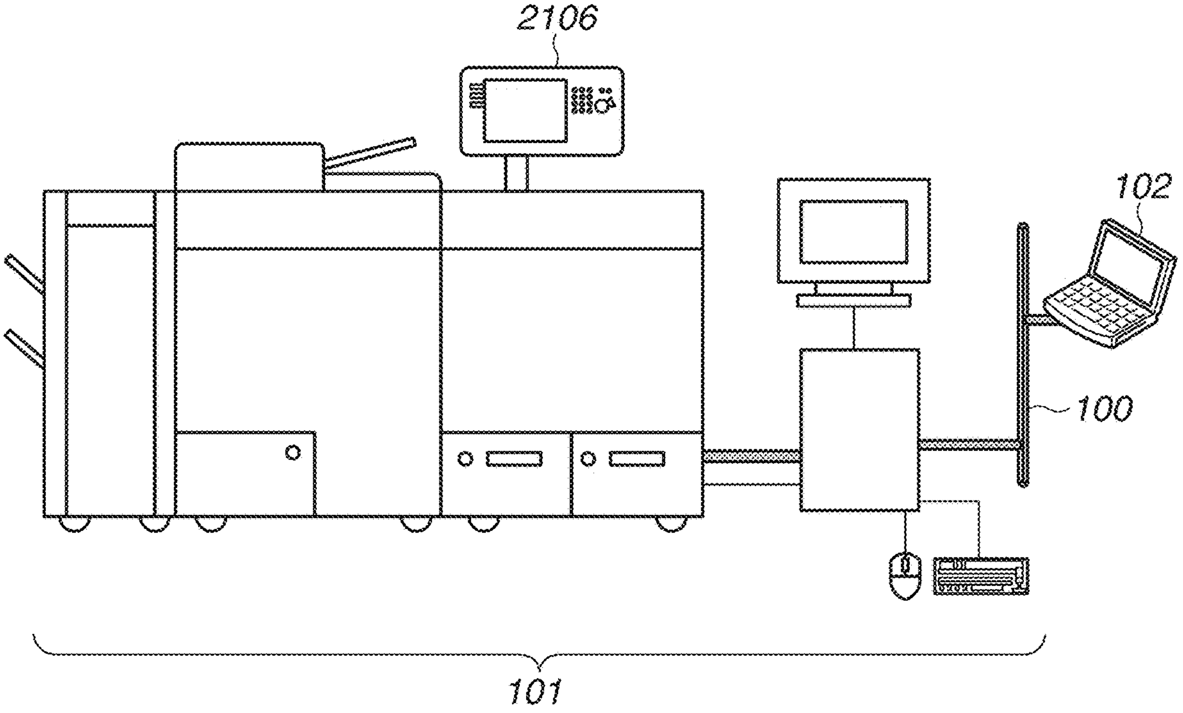
FIG. 1 is a diagram illustrating a configuration of a printing system.

With reference to the attached drawings, exemplary embodiments of the disclosure will be described in detail below. The following exemplary embodiments do not limit the disclosure according to the appended claims, and not all the combinations of the features described in the exemplary embodiments are essential for a method in the disclosure.

Elements of one embodiment may be implemented by hardware, firmware, software or any combination thereof. The term hardware generally refers to an element having a physical structure such as electronic, electromagnetic, optical, electro-optical, mechanical, electro-mechanical parts, etc. A hardware implementation may include analog or digital circuits, devices, processors, applications specific integrated circuits (ASICs), programmable logic devices (PLDs), field programmable gate arrays (FPGAs), or any electronic devices. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc., that is implemented or embodied in a hardware structure (e.g., flash memory, ROM, EROM).

Examples of firmware may include microcode, writable control store, micro-programmed structure.

When implemented in software or firmware, the elements of an embodiment may be the code segments to perform the necessary tasks. The software/firmware may include the actual code to carry out the operations described in one embodiment, or code that emulates or simulates the operations. The program or code segments may be stored in a processor or machine accessible medium. The "processor readable or accessible medium" or "machine readable or accessible medium" may include any non-transitory medium that may store information. Examples of the processor readable or machine accessible medium that may store include a storage medium, an electronic circuit, a semiconductor memory device, a read only memory (ROM), a flash memory, an erasable programmable ROM (EPROM), a floppy diskette, a compact disk (CD) ROM, an optical disk, a hard disk, etc. The machine accessible medium may be embodied in an article of manufacture. The machine accessible medium may include information or data that, when accessed by a machine, cause the machine to perform the operations or actions described above. The machine accessible medium may also include program code, instruction or instructions embedded therein. The program code may include machine readable code, instruction or instructions to perform the operations or actions described above. The term "information" or "data" here refers to any type of information that is encoded for machine-readable purposes. Therefore, it may include program, code, data, file, etc.

All or part of an embodiment may be implemented by various means depending on applications according to particular features, functions. These means may include hardware, software, or firmware, or any combination thereof. A hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

FIG. 1 is a diagram illustrating the configuration of a printing system according to a first exemplary embodiment.

As illustrated in FIG. 1, in the printing system, an information processing apparatus 102 and an image forming apparatus 101 are connected together via a local area network (LAN) 100 (a network). The image forming apparatus 101 can print a print job received from the information processing apparatus 102.

Figure 2:
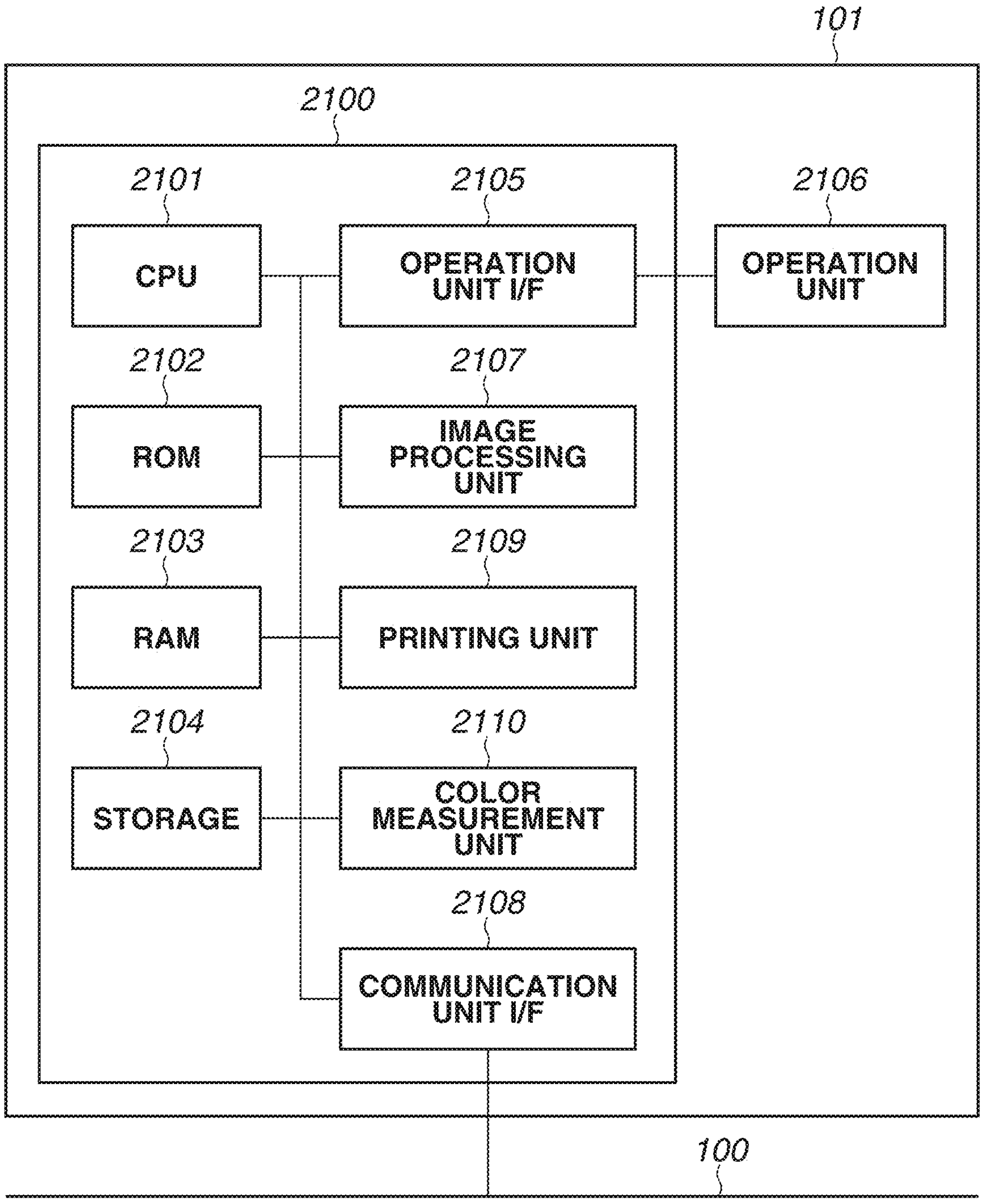
FIG. 2 is a block diagram illustrating a hardware configuration of an image forming apparatus.

FIG. 2 is a block diagram illustrating the hardware configuration of the image forming apparatus 101 according to the present exemplary embodiment. The image forming apparatus 101 has a print function for printing an image on a sheet. The image forming apparatus 101 is also occasionally termed a multifunction peripheral (MFP). A control unit 2100 including a central processing unit (CPU) 2101 controls the operation of the entirety of the image forming apparatus 101. The CPU 2101 loads a program stored in a read-only memory (ROM) 2102 or storage 2104 into a random-access memory (RAM) 2103 and executes the program, to perform various types of control, such as print control and reading control. The ROM 2102 stores a control program and a boot program that can be executed by the CPU 2101. The RAM 2103 is a main storage memory of the CPU 2101 and is used as a work area or a temporary storage area into which various control programs are loaded. The storage 2104 stores print data, image data, various programs, and various pieces of setting information. In the present exemplary embodiment, as the storage 2104, an auxiliary storage device, such as a hard disk drive (HDD), is used. Alternatively, a non-volatile memory, such as a solid-state drive (SSD), may be used. In the image forming apparatus 101 according to the present exemplary embodiment, a single CPU 2101 executes processes illustrated in flowcharts described below, using a single memory (the RAM 2103). Alternatively, another form may be employed. For example, a plurality of CPUs, RAMs, ROMs, and spaces of storage may cooperate to execute the processes illustrated in the flowcharts described below. Yet alternatively, some of the processes may be executed using a hardware circuit, such as an application-specific integrated circuit (ASIC) or a field-programmable gate array (FPGA).

An operation unit interface (I/F) 2105 connects an operation unit 2106 and the control unit 2100. The operation unit 2106 includes a display unit having a touch panel function and various hardware keys, and functions as a display unit that displays information and a reception unit that receives an instruction from a user.

An image processing unit 2107 has the function of a raster image processor (RIP) that rasterizes a print job received via a communication unit I/F 2108, to generate image data for use in printing. The image processing unit 2107 can also perform a resolution conversion process and a correction process on the image data obtained by rasterizing the print job. In the present exemplary embodiment, the image processing unit 2107 is achieved by a hardware circuit (an ASIC or an FPGA). The disclosure, however, is not limited to this. Alternatively, for example, the image forming apparatus 101 may further include a processor for image processing, and the processor may execute an image processing program, to achieve image processing and a rasterization process on print data. In this case, the processor and the CPU 2101 cooperate to achieve the flowcharts described below. Yet alternatively, a configuration can also be employed in which the CPU 2101 executes a program for performing image processing, to perform image processing and a rasterization process on print data. Yet alternatively, image processing may be performed based on the combination of any of the above-described methods.

Based on the image data generated by the image processing unit 2107, a printing unit (printer engine) 2109 prints an image on a sheet fed from a sheet feeding cassette (not illustrated). The printing unit 2109 includes a laser exposure unit, an image forming unit, a fixing unit, and a sheet feeding unit. The laser exposure unit is a device that performs primary charging for irradiating a photosensitive drum with laser light to transfer a toner image, and laser exposure. First, the laser exposure unit performs primary charging for charging the surface of the photosensitive drum to a uniform negative potential. Next, a laser driver irradiates the photosensitive drum with laser light while adjusting the angle of reflection using a polygon mirror. This neutralizes the negative charge of the irradiated portion, and therefore an electrostatic latent image is formed. The image forming unit is a device that transfers toner onto a sheet. The image forming unit includes a developing unit, a transfer unit, a toner supply unit. The image forming unit transfers toner on the photosensitive drum onto a sheet. The developing unit attaches negatively charged toner to an electrostatic latent image on the surface of the photosensitive drum from a developing cylinder, to visualize the image. The transfer unit performs a primary transfer for applying a positive potential to a primary transfer roller and transferring toner on the surface of the photosensitive drum onto a transfer belt, and a secondary transfer for applying a positive potential to a secondary transfer outer roller and transferring the toner on the transfer belt onto a sheet. The fixing unit is a device that melts toner on a sheet and firmly fixes the toner to the sheet by heat and pressure. The fixing unit includes a heating heater, a fixing belt, and a pressure belt. The sheet feeding unit is a device that feeds a sheet. Rollers and various sensors control a sheet feeding operation and a sheet conveying operation.

The printing method of the printing unit 2109 may be an electrophotographic method, or may be an inkjet method. Alternatively, another printing method such as a thermal transfer method can also be applied.

A color measurement unit 2110 is disposed downstream of a sheet conveying path of the printing unit 2109. Using contact image sensor (CIS) color sensors, the color measurement unit 2110 measures the colors of gradation patches of each color as gradation correction marks formed on a sheet (a recording sheet) on which an image is printed, to acquire color measurement data. The control unit 2100 is connected to the LAN 100 via the communication unit I/F 2108. The communication unit I/F 2108 receives a print request (a print job) from the information processing apparatus 102 on the LAN 100.

While the present exemplary embodiment is described using the above configuration as an example of the printing system, the present exemplary embodiment is not limited to this, and at least one or more information processing apparatuses and at least one or more image forming apparatuses are to be connected together via a network so that the at least one or more information processing apparatuses and the at least one or more image forming apparatuses can communicate with each other. The network may be a wireless network or a wired network.

Figure 3:
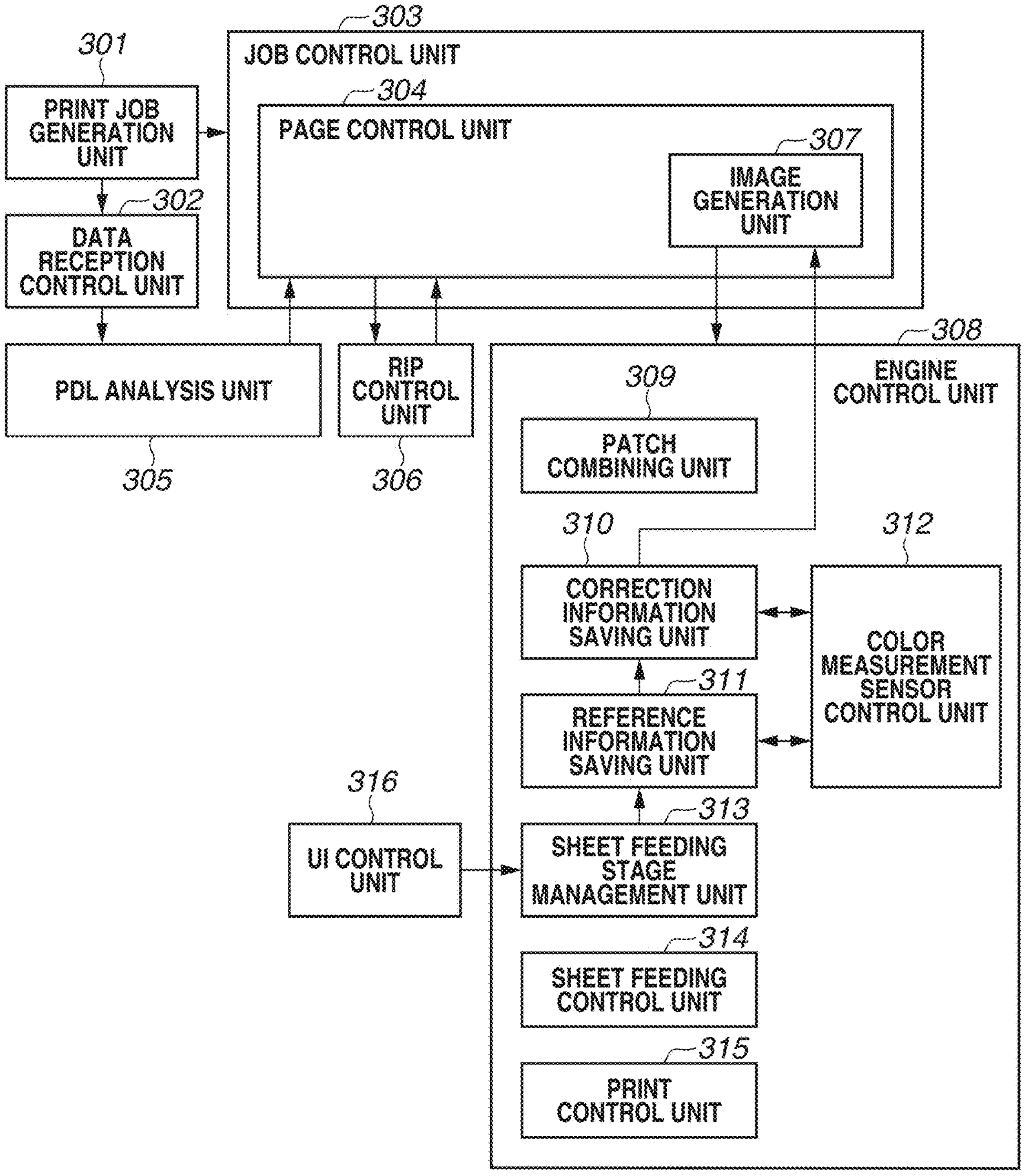
FIG. 3 is a block diagram illustrating a software configuration of the image forming apparatus.

FIG. 3 is a block diagram illustrating the software configuration of the image forming apparatus 101 according to the present exemplary embodiment.

In response to a submission of a job, a print job generation unit 301 generates a print job and registers the print job in a job control unit 303. The job control unit 303 notifies a page control unit 304 that the page processing is started page by page in order from the first page for all pages included in the registered print job. In response to a notification from the page control unit 304 that the processing of the next page can be started, the job control unit 303 notifies the page control unit 304 that the processing of the next page is started. The job control unit 303 repeats this process. Then, in response to a notification from the page control unit 304 that the processing of all the pages is completed, the job control unit 303 notifies the print job generation unit 301 that the job ends.

In response to a notification from the job control unit 303 that page processing is started, the page control unit 304 controls the processing of each page. A data reception control unit 302 receives page description language (PDL) data transmitted from the information processing apparatus 102 via the communication unit I/F 2108. A PDL analysis unit 305 analyzes the received PDL data and converts the PDL data into intermediate data. A RIP control unit 306 rasterizes the intermediate data and converts the intermediate data into image data in a bitmap format.

An image generation unit 307 reflects correction information regarding a sheet for use in printing on the generated image data in the bitmap format, to generate a corrected print image. Then, the image generation unit 307 transfers the print image to a patch combining unit 309 of an engine control unit 308. The image generation unit 307 controls the image processing unit 2107 in FIG. 2.

The engine control unit 308 includes the patch combining unit 309, a correction information saving unit 310, a reference information saving unit 311, a color measurement sensor control unit 312, a sheet feeding stage management unit 313, a sheet feeding control unit 314, and a print control unit 315. The color measurement sensor control unit 312 controls the color measurement unit 2110. The patch combining unit 309, the correction information saving unit 310, the reference information saving unit 311, the sheet feeding stage management unit 313, the sheet feeding control unit 314, and the print control unit 315 control the printing unit 2109.

To form gradation correction marks in addition to an image formed based on the corrected print image received from the image generation unit 307, the patch combining unit 309 combines gradation correction mark information (gradation patches) with the print image. Then, the patch combining unit 309 instructs the print control unit 315 to print the combined image.

The sheet feeding control unit 314 controls a sheet feeding stage according to an instruction given by a print job, conveys a sheet (a recording sheet) stored in the sheet feeding stage, and supplies the sheet. The print control unit 315 prints the print image combined with the gradation patches on the sheet supplied by the sheet feeding control unit 314 and discharges the sheet. In the present exemplary embodiment, an image is formed on a sheet based on image data to which gradation correction mark information (gradation patches) is added, where necessary.

The color measurement sensor control unit 312 controls the color measurement unit 2110 to measure the gradation correction marks formed on the sheet, to acquire color measurement data. The reference information saving unit 311 holds reference information generated based on the color measurement data acquired by the color measurement sensor control unit 312 on a sheet type basis set in sheet feeding stages. The correction information saving unit 310 holds correction information obtained by comparing the reference information held in the reference information saving unit 311 and the color measurement data acquired by the color measurement sensor control unit 312 on a sheet type basis set in the sheet feeding stages.

The sheet feeding stage management unit 313 manages information regarding the sizes and the types of sheets set in all the sheet feeding stages included in the image forming apparatus 101. Further, according to a request to register a sheet from a user interface (UI) control unit 316, the sheet feeding stage management unit 313 clears reference information regarding a sheet type to be removed for replacement from the reference information saving unit 311. Further, in a case where the correction information saving unit 310 holds correction information regarding the sheet type to be removed for replacement, the sheet feeding stage management unit 313 also clears the correction information.

After the user sets information regarding a sheet in a sheet feeding stage by operating the operation unit 2106, the UI control unit 316 requests the sheet feeding stage management unit 313 to register the sheet. The UI control unit 316 displays on the operation unit 2106 the information regarding the registered sheet. The UI control unit 316 controls the operation unit 2106.

Figure 4A:
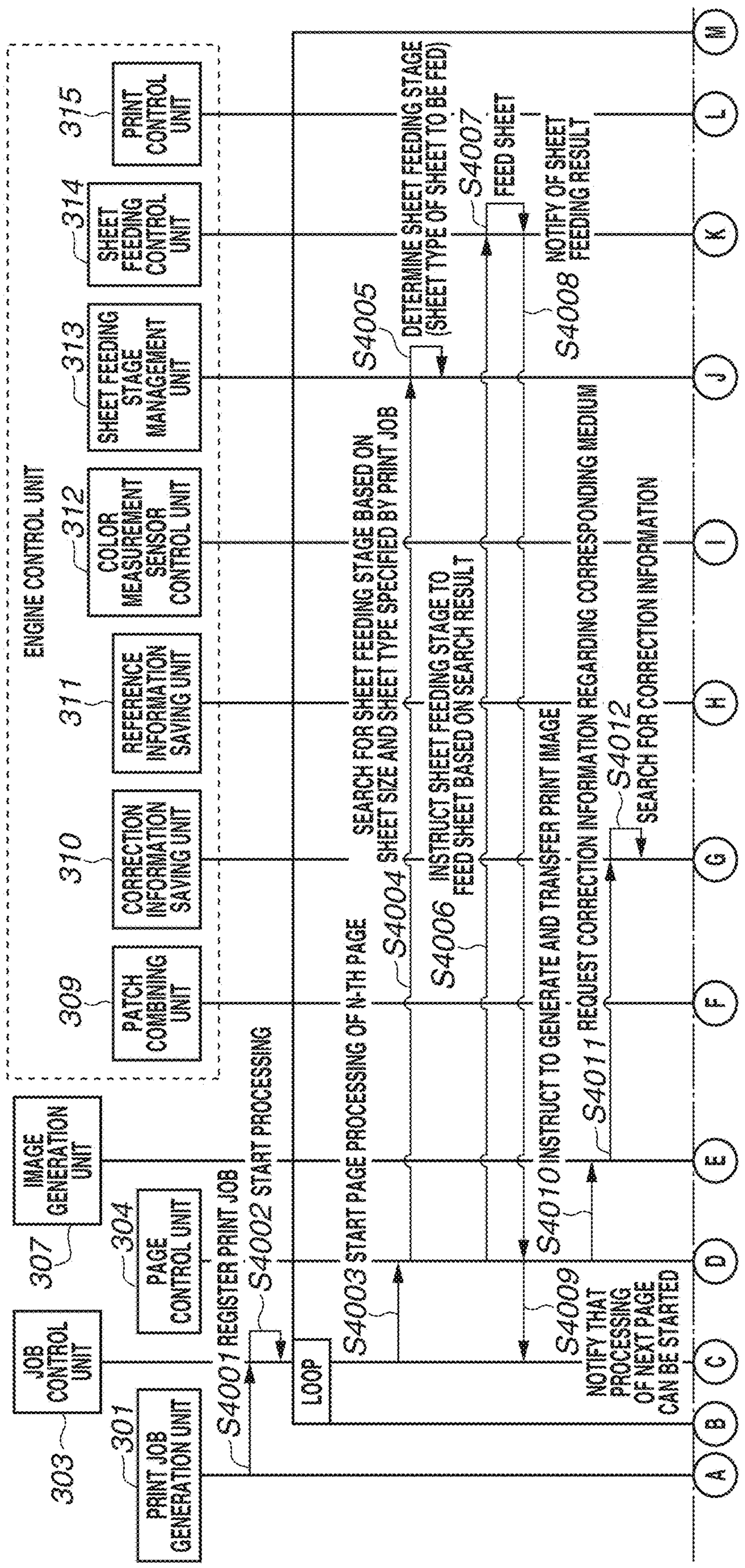
FIGS. 4A, 4B, and 4C are sequence diagrams for a margin insertion-type printing process.
Figure 4B:
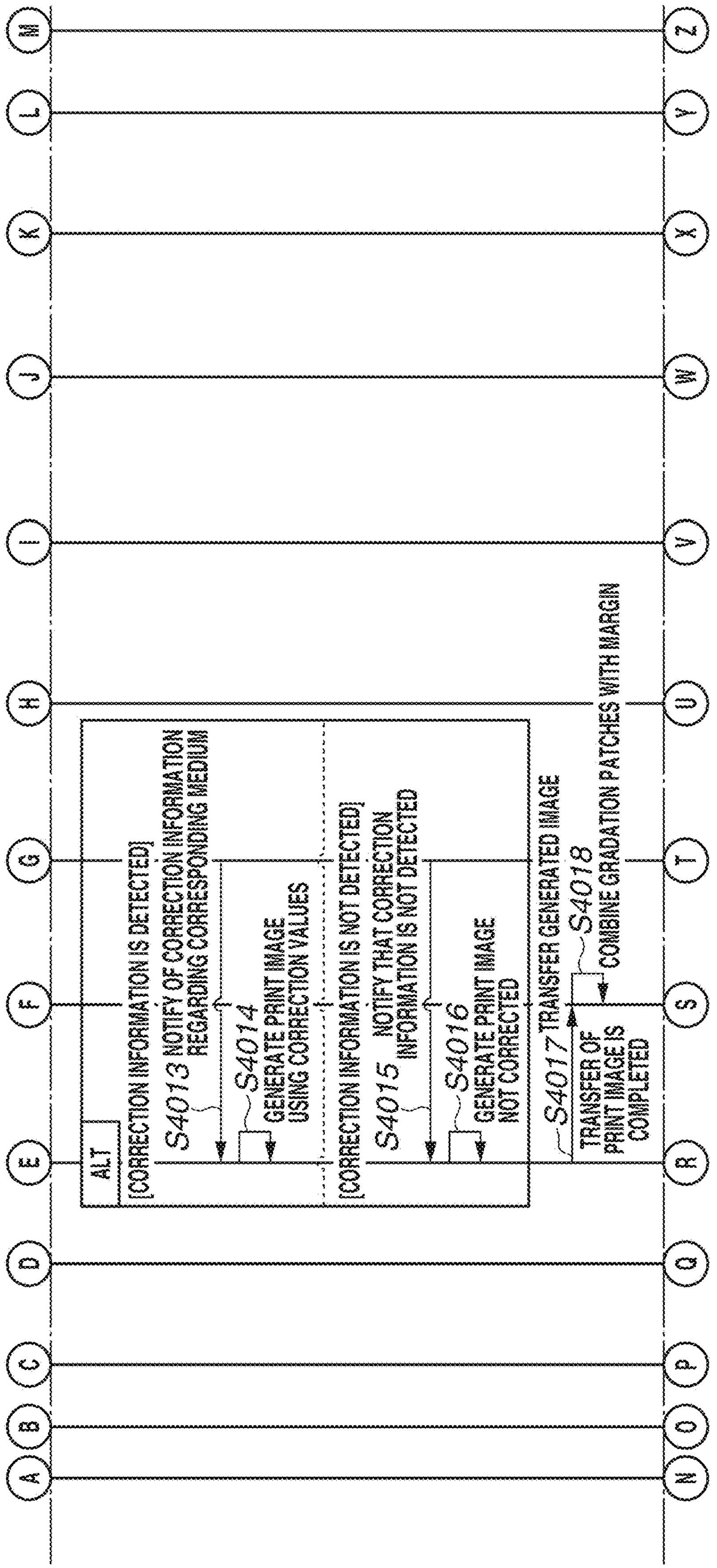
Figure 4C:
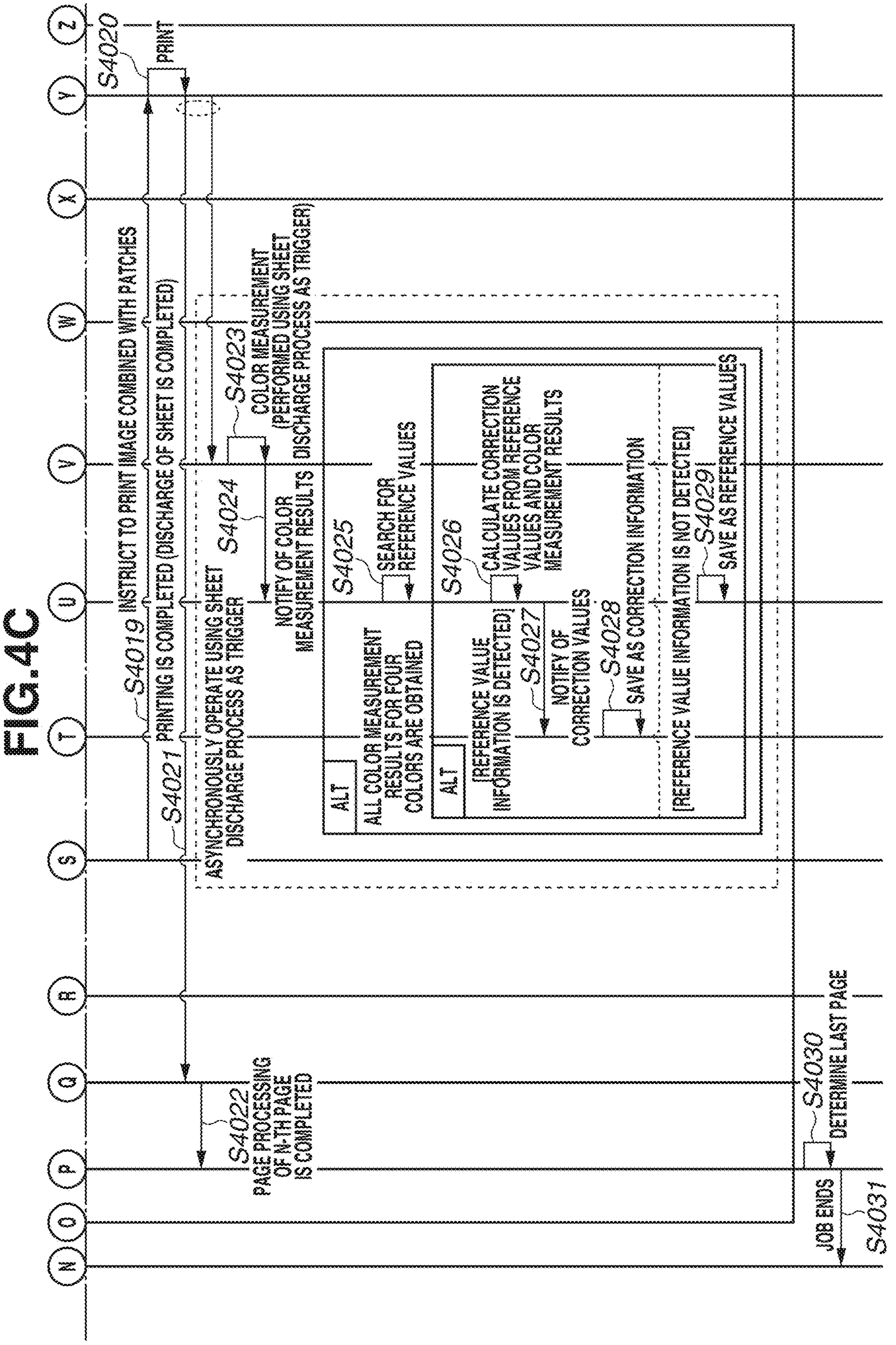

Next, with reference to FIGS. 4A to 4C, a description is given of the basic sequence of a printing process for forming color measurement patches for gradation correction on an output sheet for a print job, measuring the color measurement patches in real time using color measurement sensors, and continuously feeding back correction values to a subsequent page. This sequence is achieved by the CPU 2101 of the image forming apparatus 101 loading a program stored in the ROM 2102 into the RAM 2103 and executing the program.

In step S4001, the print job generation unit 301 receives print data from the communication unit I/F 2108 and generates a print job. The print job generation unit 301 registers the generated job in the job control unit 303.

In step S4002, the job control unit 303 determines the execution order of the registered job and sequentially starts processing. In step S4003, with regard to the job currently subjected to the processing, the job control unit 303 notifies the page control unit 304 that the processing of an N-th page is started.

In response to the notification from the job control unit 303 that the processing of the N-th page is started, in step S4004, the page control unit 304 inquires of the sheet feeding stage management unit 313 about which sheet feeding stage a sheet of a sheet size and a sheet type specified for the page is to be fed from. In step S4005, based on the specified sheet size and sheet type, the sheet feeding stage management unit 313 determines which sheet feeding stage a sheet is to be fed from. Then, the sheet feeding stage management unit 313 returns the determination result to the page control unit 304.

In step S4006, the page control unit 304 instructs the sheet feeding control unit 314 to feed a sheet from the sheet feeding stage determined by the sheet feeding stage management unit 313. In step S4007, according to the instruction from the page control unit 304 to feed a sheet, the sheet feeding control unit 314 feeds a sheet from the determined sheet feeding stage. In step S4008, the sheet feeding control unit 314 notifies the page control unit 304 of the sheet feeding result. In a case where receiving a normal sheet feeding result from the sheet feeding control unit 314, then in step S4009, the page control unit 304 notifies the job control unit 303 that the processing of the next page becomes able to be started. Further, in response to receiving of a normal sheet feeding result from the sheet feeding control unit 314, then in step S4010, the page control unit 304 instructs the image generation unit 307 to generate and transfer a print image. In this operation, the page control unit 304 notifies the image generation unit 307 of the sheet feeding stage, the sheet size, and the sheet type of the fed sheet.

In response to receiving of the instruction to generate and transfer a print image, then in step S4011, based on the information received by the image generation unit 307, the image generation unit 307 requests correction information from the correction information saving unit 310. In step S4012, the correction information saving unit 310 searches for correction information corresponding to the transmitted information, to determine whether the corresponding correction information is saved in the RAM 2103. In a case where the corresponding correction information is detected, then in step S4013, the correction information saving unit 310 notifies the image generation unit 307 of the correction information. In step S4014, using the correction information received by the image generation unit 307 from the correction information saving unit 310, the image generation unit 307 generates a print image. Meanwhile, in a case where the correction information corresponding to the transmitted information is not detected, then in step S4015, the correction information saving unit 310 notifies the image generation unit 307 that the correction information is not detected. In a case where the correction information is not detected, then in step S4016, the image generation unit 307 generates a print image that is not corrected. In step S4017, the image generation unit 307 transfers to the patch combining unit 309 the generated print image and the information such as the sheet feeding stage, the sheet size, and the sheet type received by the image generation unit 307 from the page control unit 304.

In step S4018, the patch combining unit 309 combines gradation adjustment mark information (gradation patches) with the margin of the print image transferred from the image generation unit 307. Next, in step S4019, the patch combining unit 309 transmits to the print control unit 315 the generated combined image and the information, such as the sheet feeding stage, the sheet size, and the sheet type received by the patch combining unit 309 from the image generation unit 307. Then, the patch combining unit 309 instructs the print control unit 315 to print the combined image. In step S4020, the print control unit 315 prints the received image (the image combined with the gradation adjustment mark information) on the sheet supplied by the sheet feeding control unit 314. After completion of the printing, then in step S4021, the print control unit 315 notifies the page control unit 304 and the color measurement sensor control unit 312 that the printing is completed (the discharge of the sheet is completed). To the notification that the printing is completed (the discharge of the sheet is completed), the information such as the sheet feeding stage, the sheet size, and the sheet type is added.

In response to the notification from the print control unit 315 that the printing is completed (the discharge of the sheet is completed), then in step S4022, the page control unit 304 notifies the job control unit 303 that the processing of the N-th page is completed.

Meanwhile, in response to the notification from the print control unit 315 that the printing is completed (the discharge of the sheet is completed), then in step S4023, the color measurement sensor control unit 312 performs color measurement on the gradation adjustment mark information (the gradation patches) printed in step S4020. Next, in step S4024, the color measurement sensor control unit 312 associates the color measurement results with the information such as the sheet feeding stage, the sheet size, and the sheet type received by the color measurement sensor control unit 312 from the print control unit 315. Then, the color measurement sensor control unit 312 notifies the reference information saving unit 311 of the color measurement results. The reference information saving unit 311 holds the color measurement results received by the reference information saving unit 311 from the color measurement sensor control unit 312 on a sheet type basis in the RAM 2103. In a case where all the color measurement results for four colors required for adjustment are not obtained, the processing ends. If all the color measurement results for the four colors required for adjustment are obtained, the processing proceeds to step S4025. In step S4025, the reference information saving unit 311 searches for reference values corresponding to the information received by the reference information saving unit 311 from the color measurement sensor control unit 312, to determine whether the corresponding reference values are saved in the RAM 2103. In a case where the reference values corresponding to the information received by the reference information saving unit 311 are saved, then in step S4026, the reference information saving unit 311 calculates correction values (gradation correction data) from the saved reference values and the color measurement results received by the reference information saving unit 311 from the color measurement sensor control unit 312. Next, in step S4027, the reference information saving unit 311 notifies the correction information saving unit 310 of the calculated correction values. In step S4028, the correction information saving unit 310 saves, as correction information, the content received by the correction information saving unit 310 from the reference information saving unit 311.

In a case where the reference values are not saved in step S4025, then in step S4029, the reference information saving unit 311 saves, as reference values in the RAM 2103, the information (the color measurement results, the sheet feeding stage, the sheet size, and the sheet type) received by the reference information saving unit 311 from the color measurement sensor control unit 312.

The processes of steps S4003 to S4029 are illustrated as a loop in the sense that the processes are executed on all the pages of the print job registered in the job control unit 303. The start of the processing of each page illustrated in step S4003 can be performed in a case where the notification that the processing of the next page can be started in step S4009 is received.

In response to the notification that the processing of the N-th page is completed, then in step S4030, the job control unit 303 determines whether the N-th page is the last page of the print job. In a case where determining that the job control unit 303 receives the notification that the processing of the last page is completed, then in step S4031, the job control unit 303 notifies the print job generation unit 301 that the job ends.

Figure 5:
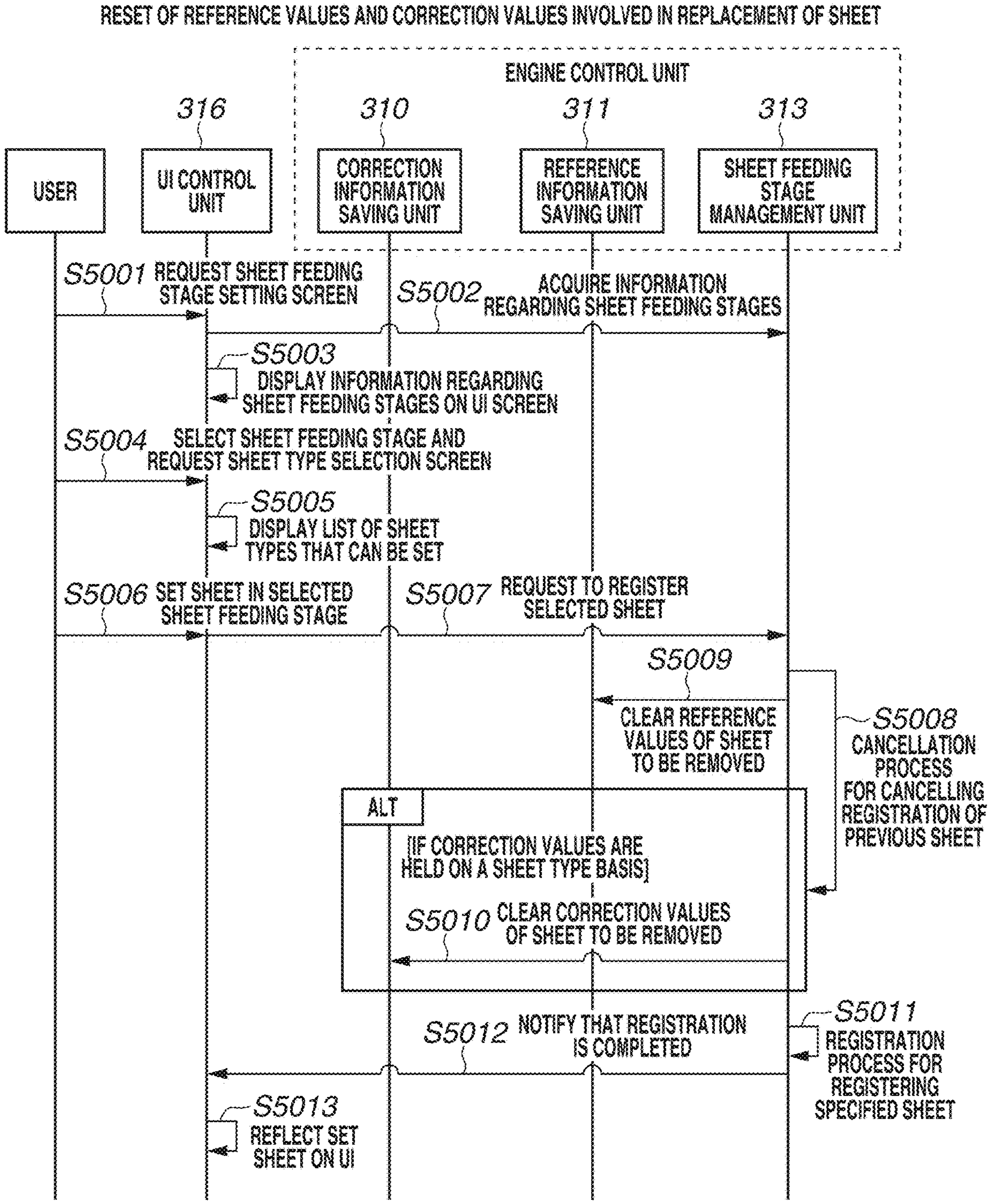
FIG. 5 is a sequence of a process of registering and deleting reference values and correction values.

Next, with reference to FIG. 5, a description is given of a sequence for clearing reference information and correction information. This sequence is achieved by the CPU 2101 of the image forming apparatus 101 loading a program stored in the ROM 2102 into the RAM 2103 and executing the program.

When the image forming apparatus 101 forms an image on a sheet, the properties of the sheet differ depending on the sheet type. Thus, to correctly perform gradation correction, the image forming apparatus 101 is to hold reference information on a sheet type basis. Although the image forming apparatus 101 supports many sheet types, a sheet to be actually used is to be set in a sheet feeding stage, and therefore, the reference information saving unit 311 holds reference information regarding sheet types set in the sheet feeding stages. Thus, when the user sets a new sheet in a sheet feeding stage of the image forming apparatus 101, reference information and correction information regarding a sheet type to be removed for replacement are cleared.

Figure 7A:
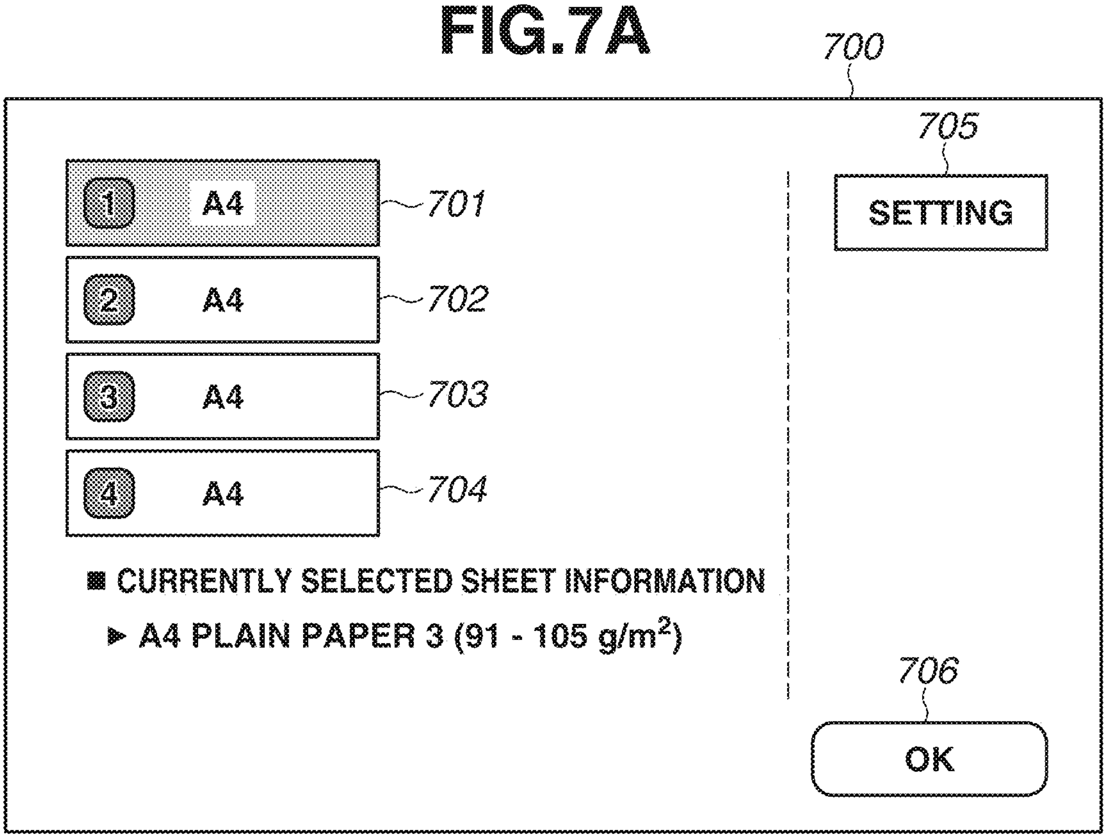
FIGS. 7A and 7B are screen transition diagrams illustrating sheet replacement screens.

In step S5001, the user operates a UI screen of the image forming apparatus 101, to select a sheet feeding stage setting screen. After receiving the operation from the user, then in step S5002, the UI control unit 316 of the image forming apparatus 101 acquires, from the sheet feeding stage management unit 313, information regarding the sizes and the types of sheets set in all the sheet feeding stages included in the image forming apparatus 101. In step S5003, the UI control unit 316 displays the information acquired in step S5002 on the UI screen. FIG. 7A illustrates an example of the screen.

In step S5004, on the UI screen of the image forming apparatus 101, the user selects a sheet feeding stage where the user wishes to change a sheet. After receiving the selection operation from the user, then in step S5005, the UI control unit 316 of the image forming apparatus 101 displays on the UI screen a list of sheet types that can be set in the selected sheet feeding stage. FIG. 7B illustrates an example of the screen. In step S5006, on the UI screen of the image forming apparatus 101, the user selects a sheet type that the user wishes to change. After receiving the selection operation from the user, then in step S5007, the UI control unit 316 of the image forming apparatus 101 requests the sheet feeding stage management unit 313 to register the sheet feeding stage and the sheet type selected by the user. In step S5008, the sheet feeding stage management unit 313 updates information saved in the reference information saving unit 311 and the correction information saving unit 310. A detailed processing procedure will be described below with reference to FIG. 6A. Based on a flowchart in FIG. 6A, in a case where the sheet feeding stage management unit 313 determines that it is necessary to clear reference information and correction information, then in steps S5009 and S5010, the sheet feeding stage management unit 313 performs a clearing process. In step S5009, the sheet feeding stage management unit 313 clears reference information regarding the sheet type to be removed for replacement from the reference information saving unit 311. Further, in step S5010, the sheet feeding stage management unit 313 checks whether correction information regarding the sheet type to be removed for replacement is detected in the correction information saving unit 310. In a case where the correction information is detected, the sheet feeding stage management unit 313 clears the correction information. After a series of processes in step S5008 is completed, then in step S5011, the sheet feeding stage management unit 313 performs a registration process for registering the sheet type specified by the user. Then, in step S5012, the sheet feeding stage management unit 313 notifies the UI control unit 316 that the registration is completed. In step S5013, the UI control unit 316 updates the UI screen based on information regarding the registered sheet type.

Figure 6A:
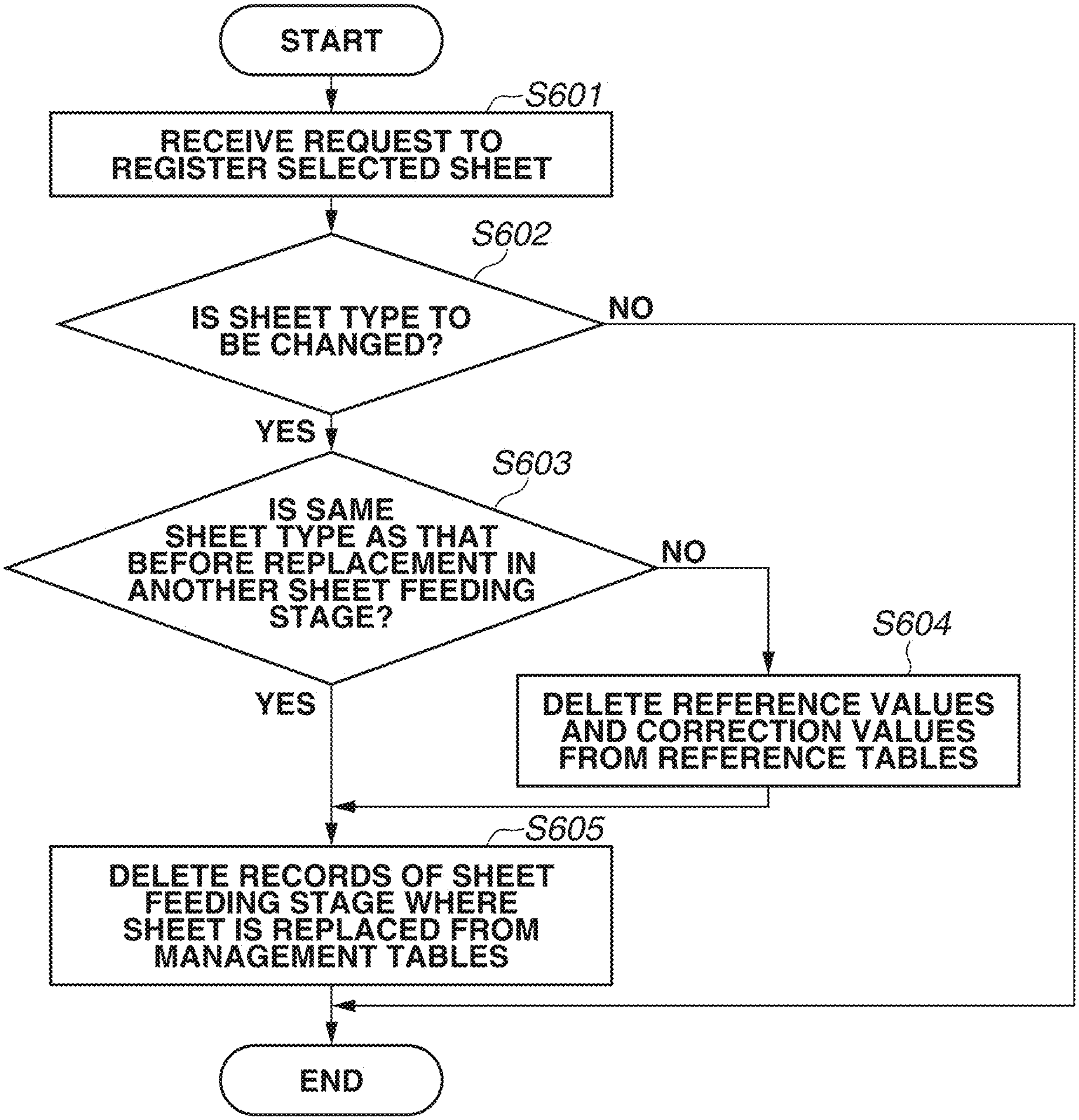
FIG. 6A is a flowchart illustrating clearing of reference information and correction information for each sheet type.
Figure 6B:
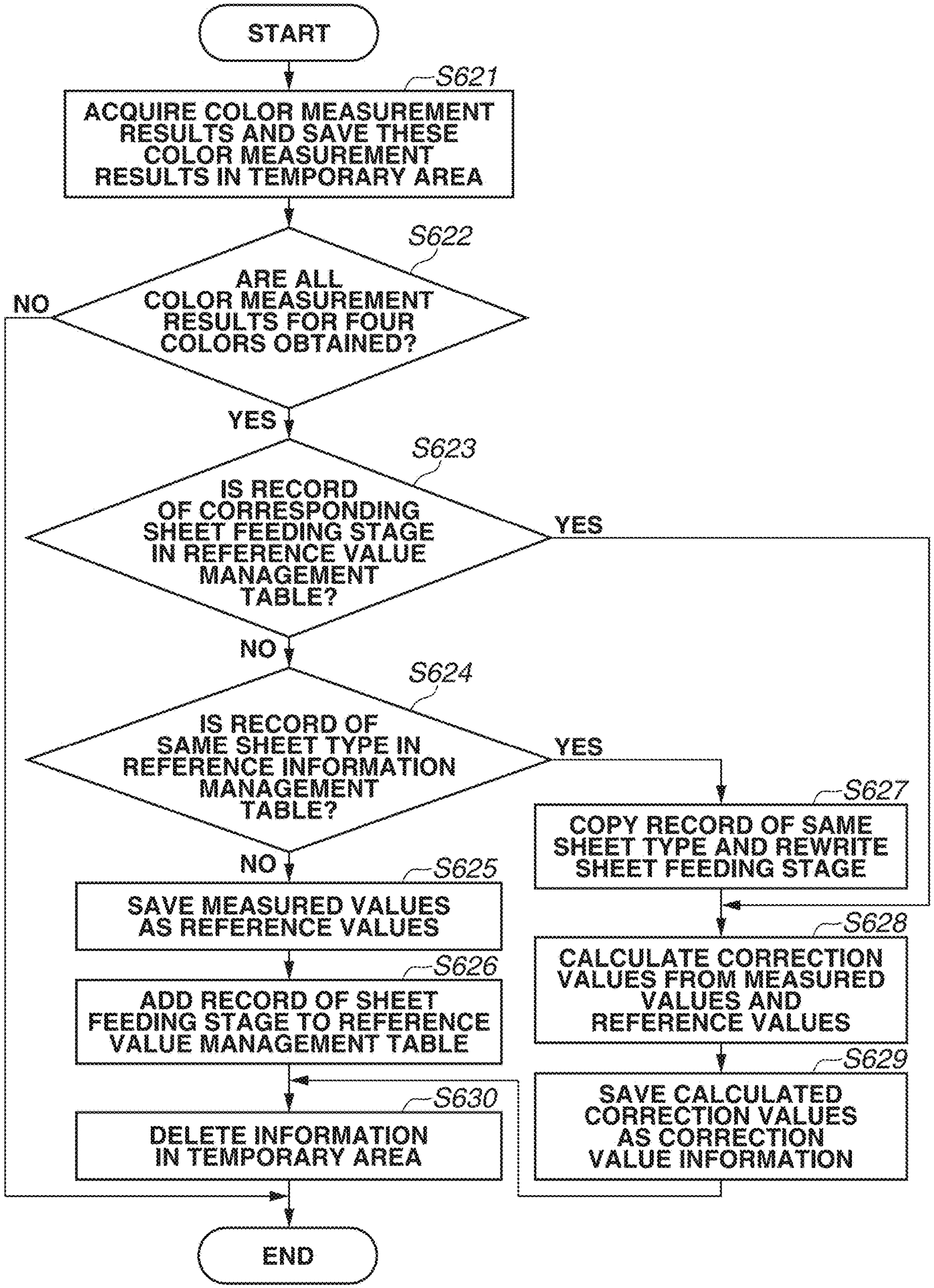
FIG. 6B is a flowchart illustrating registration of reference information and correction information for each sheet type.
Figure 7B:
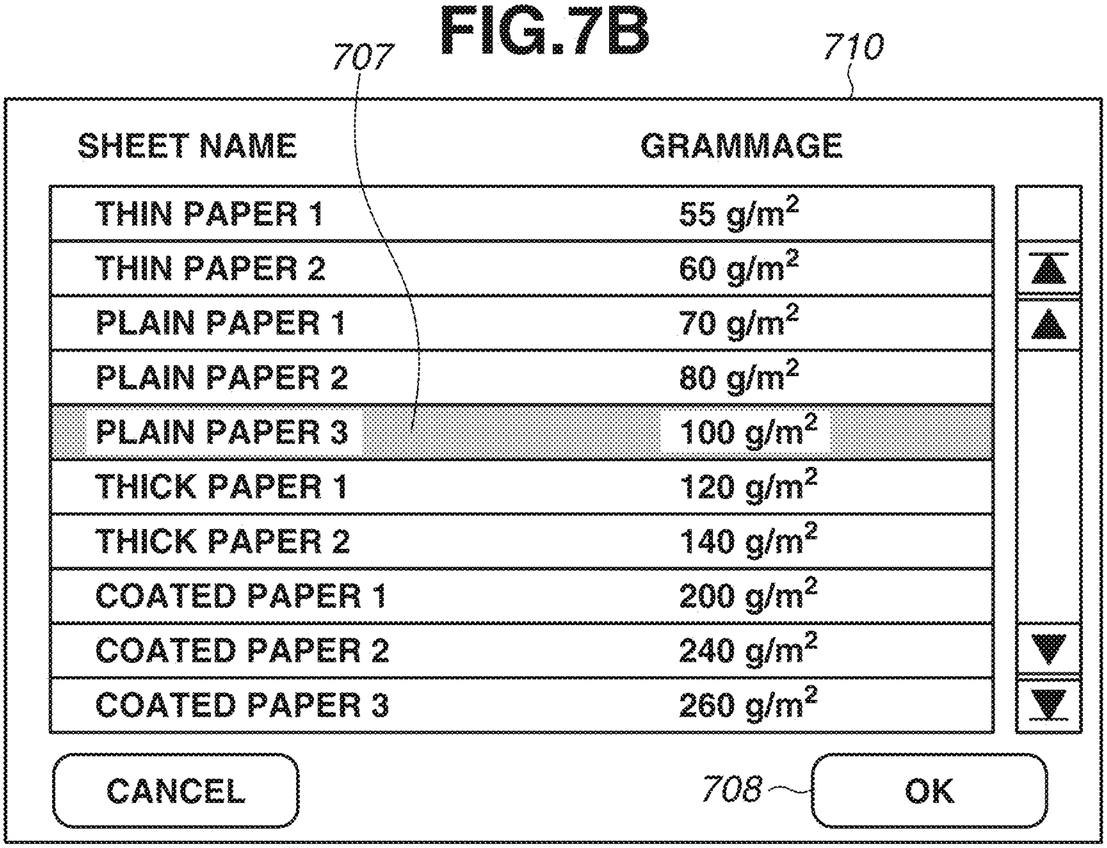

FIGS. 6A and 6B illustrate processing procedures of the sheet feeding stage management unit 313 that are involved in a change of a sheet type registered in each sheet feeding stage of the image forming apparatus 101. FIG. 6A is a flowchart illustrating the clearing of reference information and correction information regarding each sheet type. FIG. 6B is a flowchart illustrating the registration of reference information and correction information regarding each sheet type.

First, a description is given with reference to FIG. 6A. FIG. 6A is a processing procedure of the sheet feeding stage management unit 313 in a case where registration of the sheet feeding stage and the sheet type selected by the user in step S5007 in FIG. 5 is requested.

In step S601, the sheet feeding stage management unit 313 receives from the UI control unit 316 a request to register the sheet feeding stage and the sheet type selected by the user. In step S602, the sheet feeding stage management unit 313 determines whether a sheet type is to be changed. In a case where a sheet type is not to be changed (the same type is to be registered again) (NO in step S602), the processing ends. In a case where a sheet type is to be changed (YES in step S602), the processing proceeds to step 5603. In step S603, the sheet feeding stage management unit 313 checks whether the same sheet as a sheet set in the sheet feeding stage targeted in step S601 is set in another sheet feeding stage. In a case where the same sheet is in another sheet feeding stage (YES in step S603), the processing proceeds to step S605. In a case where the same sheet is not in another sheet feeding stage (NO in step S603), the processing proceeds to step S604. In step S604, since the sheet type before the change is not to be used in all the sheet feeding stages, the sheet feeding stage management unit 313 deletes reference value information and correction value information (a table (TBL) 881 and a table (TBL) 883) regarding the sheet from the reference information saving unit 311 and the correction information saving unit 310, respectively, and the processing proceeds to step S605. In step S605, the sheet feeding stage management unit 313 deletes records of sheet type information regarding the sheet feeding stage to be subjected to the setting change from a reference value management table and a correction value management table.

Next, a description is given with reference to FIG. 6B. FIG. 6B is a processing procedure of the reference information saving unit 311 and the correction information saving unit 310 in a case where the reference information saving unit 311 receives the notification of the color measurement results from the color measurement sensor control unit 312 in step S4024 in FIG. 4C.

In step S621, the reference information saving unit 311 acquires the color measurement results of patches of each color read from an output sheet by the color measurement sensor control unit 312 and saves the color measurement results in a color measurement result table for each sheet type in a temporary area.

In step S622, the reference information saving unit 311 checks whether all the color measurement results for the four colors are obtained in the color measurement result table for the sheet type saved in the temporary area in step S621. In a case where all the color measurement results for the four colors are not obtained (NO in step S622), the processing ends. In a case where all the color measurement results for the four colors are obtained (YES in step S622), the processing proceeds to step S623. In step S623, the reference information saving unit 311 checks whether a record of a sheet feeding stage associated with the color measurement results received by the reference information saving unit 311 from the color measurement sensor control unit 312 is registered in the reference value management table. In a case where the record is not registered (NO in step S623), the processing proceeds to step S624. In a case where the record is registered (YES in step S623), the processing proceeds to step S628. In step S624, the reference information saving unit 311 checks whether a sheet type associated with the color measurement results received by the reference information saving unit 311 from the color measurement sensor control unit 312 is registered for another sheet feeding stage in the reference value management table. In a case where the sheet type is not registered (NO in step S624), the processing proceeds to step S625. In step S625, the reference information saving unit 311 saves the color measurement results received by the reference information saving unit 311 from the color measurement sensor control unit 312 as reference values (the table (TBL) 881). In step S626, the reference information saving unit 311 adds the record of the sheet feeding stage associated with the color measurement results received by the reference information saving unit 311 from the color measurement sensor control unit 312 to the reference value management table. Then, the reference information saving unit 311 performs a link process for referencing the reference values saved in step S625.

Meanwhile, in a case where the reference information saving unit 311 checks in step S624 that the sheet type associated with the color measurement results received by the reference information saving unit 311 from the color measurement sensor control unit 312 is registered for another sheet feeding stage in the reference value management table (YES in step S624), the processing proceeds to step S627. In step S627, the reference information saving unit 311 copies a record of the same sheet type already registered in the reference value management table to the reference value management table as the record of the sheet feeding stage associated with the color measurement results received by the reference information saving unit 311 from the color measurement sensor control unit 312. Accordingly, reference values of this sheet type are saved. Then, the processing proceeds to step S628.

In step S628, the reference information saving unit 311 calculates correction values from the measured values and the reference values and notifies the correction information saving unit 310 of the calculated correction values. Then, in step S629, the correction information saving unit 310 saves the content received by the correction information saving unit 310 from the reference information saving unit 311 as correction information (the table (TBL) 883). After completion of the processes of steps S626 and S629, in step S630, the reference information saving unit 311 deletes the information in the temporary area.

Next, with reference to FIGS. 7A and 7B, a description is given of a screen for registering a sheet type for a sheet feeding stage of the image forming apparatus 101. FIG. 7A illustrates a sheet feeding stage setting screen displayed by the UI control unit 316. In a case where the user requests the sheet feeding stage setting screen (step S5001 in FIG. 5), the UI control unit 316 inquires of the sheet feeding stage management unit 313 about setting information regarding the current sheet feeding stages (step S5002). The inquiry result is displayed on a screen 700 (step S5003).

On the screen 700, the user selects a sheet feeding stage where a sheet type is to be set. In the present exemplary embodiment, selection buttons 701 to 704 are assigned to four sheet feeding stages. After selecting a sheet feeding stage, the user presses a setting button 705 for setting a sheet type (step S5004), to request a sheet type selection screen 710 in FIG. 7B (step S5005).

On the sheet type selection screen 710, the user selects a sheet type that matches a sheet type set or to be set in the sheet feeding stage selected on the screen 700. In the present exemplary embodiment, plain paper 1 is replaced with plain paper 3 (step S5006). In a case where the user presses an OK button 708, the display returns to the screen 700 from the sheet type selection screen 710. After confirming that the sheet type is successfully changed, the user presses an OK button 706. The UI control unit 316 notifies the sheet feeding stage management unit 313 of the setting of the user (step S5007), and the sheet feeding stage management unit 313 performs a registration request (steps S5008 and S5011).

Next, FIGS. 8A to 8E illustrate the printing positions of gradation correction mark information (gradation patches) for gradation correction, color sensors that measure printed color patches, and management tables that hold correction values derived from signal values from the color sensors, according to the present exemplary embodiment.

Figure 8A:
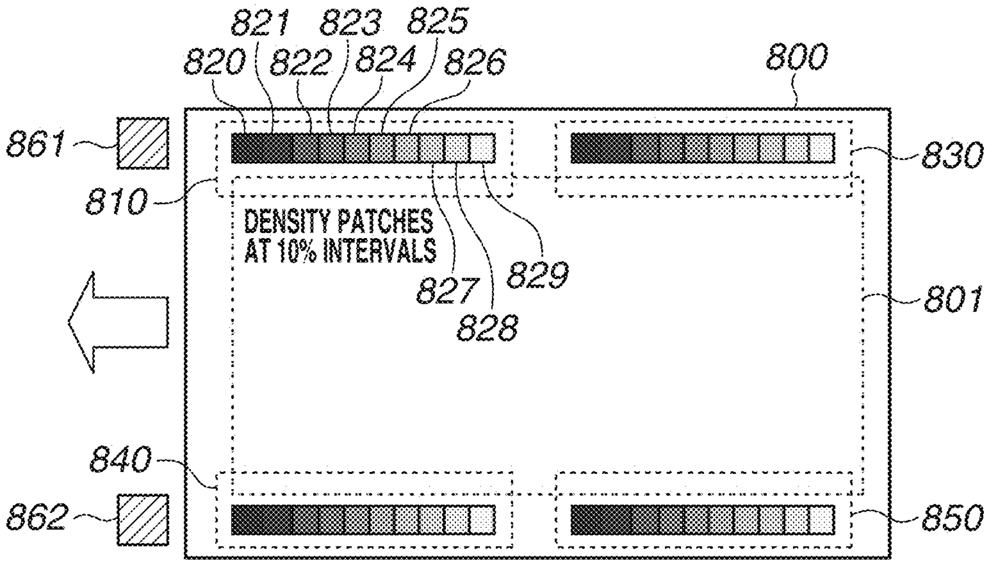
FIG. 8A is a diagram illustrating positions of patches for real-time gradation correction.

First, a description is given with reference to FIG. 8A.

FIG. 8A illustrates a print sheet 800 as an output example of gradation correction mark information (gradation patches) for real-time gradation correction according to the present exemplary embodiment.

Patches required to perform multi-level gradation correction in real time are printed in a margin area defined inside the print sheet 800 and outside a print guaranteed area 801 of the print sheet 800. The print guaranteed area 801 is a portion to be a final product and is an area where the printing of an image from the user is guaranteed. Meanwhile, while image forming is performed outside the print guaranteed area 801, the outside of the print guaranteed area 801 is trimmed and removed from the final product. The outside of the print guaranteed area 801 is used to print various patches required for image quality adjustment and information required to inspect the product. Alternatively, image forming is performed outside the print guaranteed area 801 but the outside of the print guaranteed area 801 may not be trimmed.

The patches for real-time gradation correction according to the present exemplary embodiment are arranged outside the print guaranteed area 801 and printed, and color sensors 861 and 862 of the color measurement unit 2110 in FIG. 2 read the printed patches. Thus, patches of each color are arranged parallel to a conveying direction along the positions of the color sensors 861 and 862. On the print sheet 800, 10 patches having densities in 10% intervals for a single toner color of each of cyan 810, magenta 850, yellow 830, and black 840, i.e., a total of 40 patches, are printed.

For example, the density of a cyan color patch group 820 decreases in 10% intervals from a density of 100%, and a patch 829 has a density of 10%. Also in each of magenta, yellow, and black colors, similarly, 10 patches are a single set. After all data of reference values and measured values for the four colors is obtained, feedback information required for gradation correction can be generated. The patch combining unit 309 combines the gradation correction patches with an image generated by the image generation unit 307.

Figure 8B:
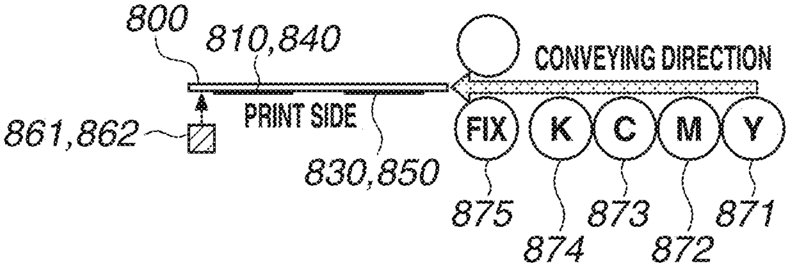
FIG. 8B is a side cross-sectional view of a conveying path.

A description is given with reference to FIG. 8B. FIG. 8B is a side cross-sectional view of a conveying path in FIG. 8A in the image forming apparatus 101. Developing devices 871 to 874 for CMYK colors in the printing unit 2109 transfer toner onto the print sheet 800, and a fixing unit 875 performs a fixing process. Then, the color sensors 861 and 862 read the patches 810, 830, 840, and 850 of the respective colors. The color sensors 861 and 862 are installed on the print side.

FIG. 8C illustrates examples of reference values, measured values, and correction values generated based on density information regarding the patches of CMYK scanned by the color sensors 861 and 862. As illustrated in FIG. 8A, since 10 patches for each of CMYK, i.e., a total of 40 patches, are printed on the print sheet 800, 40 measured values are obtained by reading the patches using the color sensors 861 and 862. In the present exemplary embodiment, the color measurement sensor control unit 312 quantifies the densities of the patches obtained by the color sensor 861 and 862 at 1024 steps and saves the densities of the patches. The reference information saving unit 311 holds the color measurement results received by the reference information saving unit 311 from the color measurement sensor control unit 312 as reference values on a sheet type basis set in the sheet feeding stages. The color measurement results are to be managed on a sheet type basis. In a case where the color measurement results of a sheet from the color measurement sensor control unit 312 are for a sheet not registered in the reference information saving unit 311, the reference information saving unit 311 saves these 40 color measurement results as new “reference values” 881. In a case where the color measurement results of a sheet from the color measurement sensor control unit 312 are for a sheet registered in the reference information saving unit 311, the reference information saving unit 311 uses these color measurement results as new “measured values” 882 and calculates correction values 883 from the differences between the reference values and the measured values. The correction values are saved in the correction information saving unit 310. While, in the present exemplary embodiment the correction values are saved, the measured values may be saved and the correction values may be calculated from the differences between the reference values and the measured values each time.

FIG. 8D is a table where the reference information saving unit 311 manages reference values. The table includes record information including items such as sheet type 891, target sheet feeding stage 892, reference value (1/2-speed) 893, reference value (1/1-speed) 894, generation page ID 895, and timestamp 896.

Based on the reference values in the management table in FIG. 8D, the plain paper 3 is set in a sheet feeding stage 1. In the printing process on the 60014th page as a total accumulated since the image forming apparatus 101 is turned on, the “plain paper 3” is fed from the “sheet feeding stage 1” at a “1/1-speed” and this printing result is registered as color measurement values and reference values at 10:04:06 on 2019 Jul. 18. In a case where the “plain paper 3” is removed from the “sheet feeding stage 1”, this record information is deleted.

FIG. 8E is a table where the correction information saving unit 310 manages correction values, and the basic configuration of the table is similar to that of the reference value management table except that the reference values are replaced with correction values. In a case where a corresponding sheet is removed from a target sheet feeding stage 897, this record information is deleted.

To perform adjustment using the management table described with reference to FIG. 8E, all the color measurement results of the patches for the four colors are to be obtained. Although there is a case where the patches for the four colors can be printed within an output sheet as in FIG. 8A, there is also a case where the margin of an output sheet is insufficient, and the patches for the four colors cannot be printed within an output sheet. In response, in the present exemplary embodiment, in a case where the patches for the four colors cannot be printed in a sheet, such an adjustment that divides the patches into two sheets to print the patches is performed. In the present exemplary embodiment, for example, in the case of an A3 sheet, the patches for the four colors are printed on an output sheet. In the case of an A4 sheet, patches for two colors (e.g., cyan and black) are printed on the first output sheet, and patches for the remaining two colors (e.g., yellow and magenta) are printed on the second output sheet.

Figure 9A:
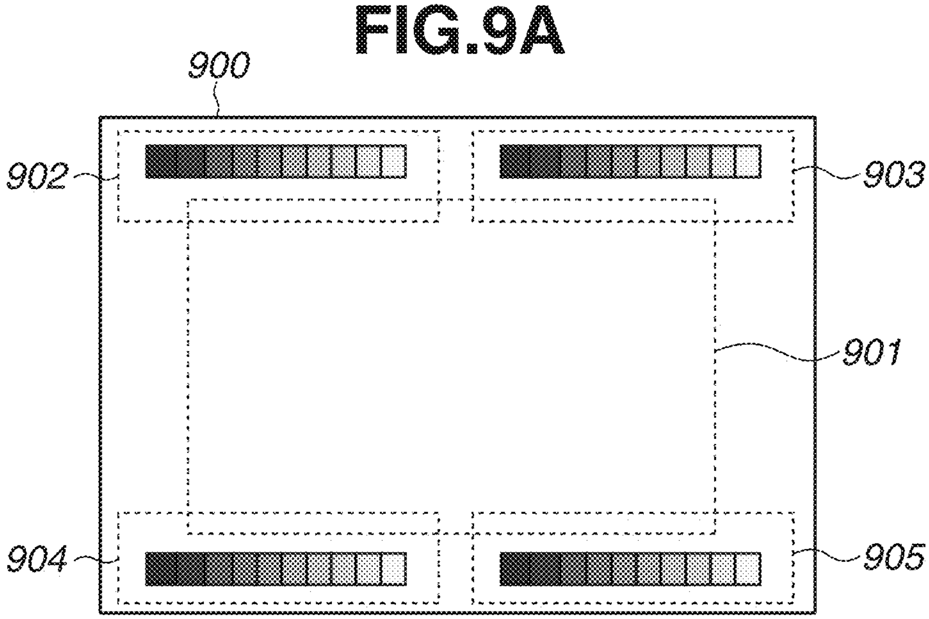
FIGS. 9A and 9B are diagrams illustrating examples of outputs of the patches for real-time multi-level gradation correction.
Figure 9B:
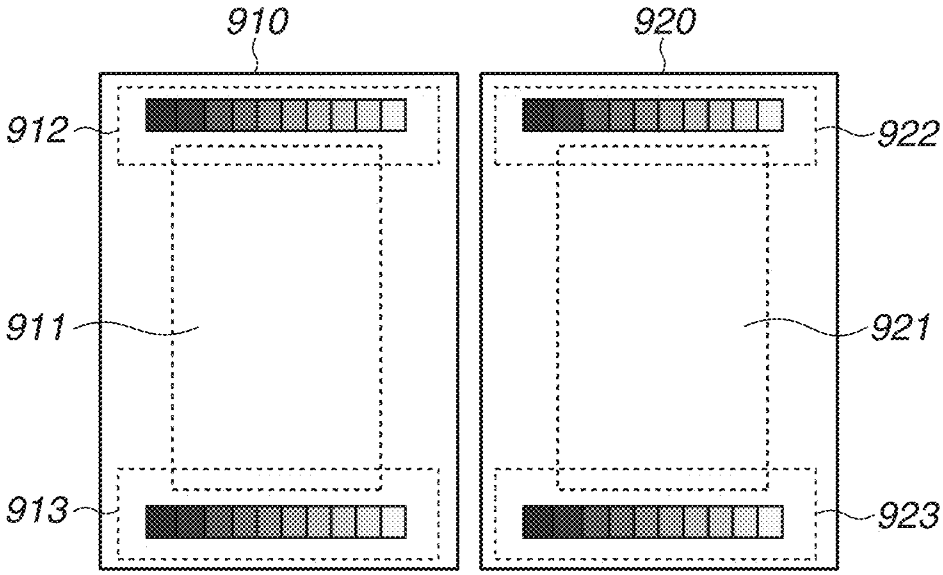

FIGS. 9A and 9B illustrate examples of outputs of the patches for real-time multi-level gradation correction according to the present exemplary embodiment based on the sheet size. To accurately read patches by the color sensors 861 and 862, the sizes of the patches of cyan 810, magenta 850, yellow 830, and black 840 illustrated in FIG. 8A are determined in advance. For example, in a case where the size in the conveying direction of a patch is 11 mm, a length of 11 m×10, i.e., 110 mm, is required to continuously print 10 patches having densities in decrements of 10% for a toner color. Further, a length of 220 mm or more is required in the conveying direction to arrange the patches of cyan (810) and yellow (830) along the conveying direction as in FIG. 8A. Thus, to print the patches, the image forming apparatus 101 is change a method for outputting the patches based on the length of the sheet size in the conveying direction. FIG. 9A illustrates an output example in a case where a sheet size has a sufficient area for applying required patches. Similarly to FIG. 8A, on a print sheet 900, 10 patches (10 steps) having densities in decrements of 10% for a toner color of each of cyan 902, magenta 905, yellow 903, and black 904, i.e., a total of 40 patches, are printed. FIG. 9B illustrates an output example in a case where a sheet size has an insufficient area for applying required patches. In this case, patches are printed on two pages, namely print sheets 910 and 920. On the print sheet 910, 10 patches (10 steps) having densities in decrements of 10% for a single toner color of each of cyan 912 and black 913, i.e., a total of 20 patches, are printed. On the print sheet 920, 10 patches (10 steps) having densities in decrements of 10% for a single toner color of each of yellow 922 and magenta 923, i.e., a total of 20 patches, are printed. The arrangement of the patches of the respective colors does not need to be limited to that in FIGS. 9A and 9B, and patches of any colors may be arranged at any positions.

FIG. 10 illustrates a method for printing patches for each sheet size. "Divide" in FIG. 10 refers to dividing the printing of the patches of cyan, yellow, black, and magenta into two sheets, and "not divide" in FIG. 10 refers to not dividing the printing of the patches of cyan, yellow, black, and magenta into two sheets. In a case where the printing of the patches of cyan, yellow, black, and magenta is not divided into two sheets, the output result as illustrated in FIG. 9A is obtained. In a case where the printing of the patches of cyan, yellow, black, and magenta is divided into two sheets, the output result as illustrated in FIG. 9B is obtained. For example, the print sheet 910 in FIG. 9B is a recording sheet to be printed first, and the print sheet 920 is a recording sheet to be printed second. While, in the present exemplary embodiment, an example is illustrated where the printing of the patches of cyan, yellow, black, and magenta is divided into two sheets, the printing of the patches of cyan, yellow, black, and magenta may be divided into three or more sheets.

Next, a description is given of a method for, in a case of a sheet size having an insufficient area for applying the patches, dividing the patches into two pages to print the patches, and a method for performing color measurement on the patches divided into two pages and performing correction.

According to the present exemplary embodiment, in a case where a sheet size has an insufficient area for applying the patches and two sheets of the same type are conveyed in a row, the patches are divided into two pages each for two colors and printed, as illustrated in FIG. 9B. Even in a case where a sheet size has an insufficient area for applying the patches, the printing on the second page (print sheet) 920 in FIG. 9B is not performed in a case where two sheets of the same sheet type are not conveyed in a row. The reason is as follows. Generally, the state of the image forming apparatus 101 changes every time printing is performed, and in one embodiment, the patches of the four colors as the basis of reference values or correction values for adjustment should be output when the image forming apparatus 101 is in the same state as much as possible.

Figure 11:
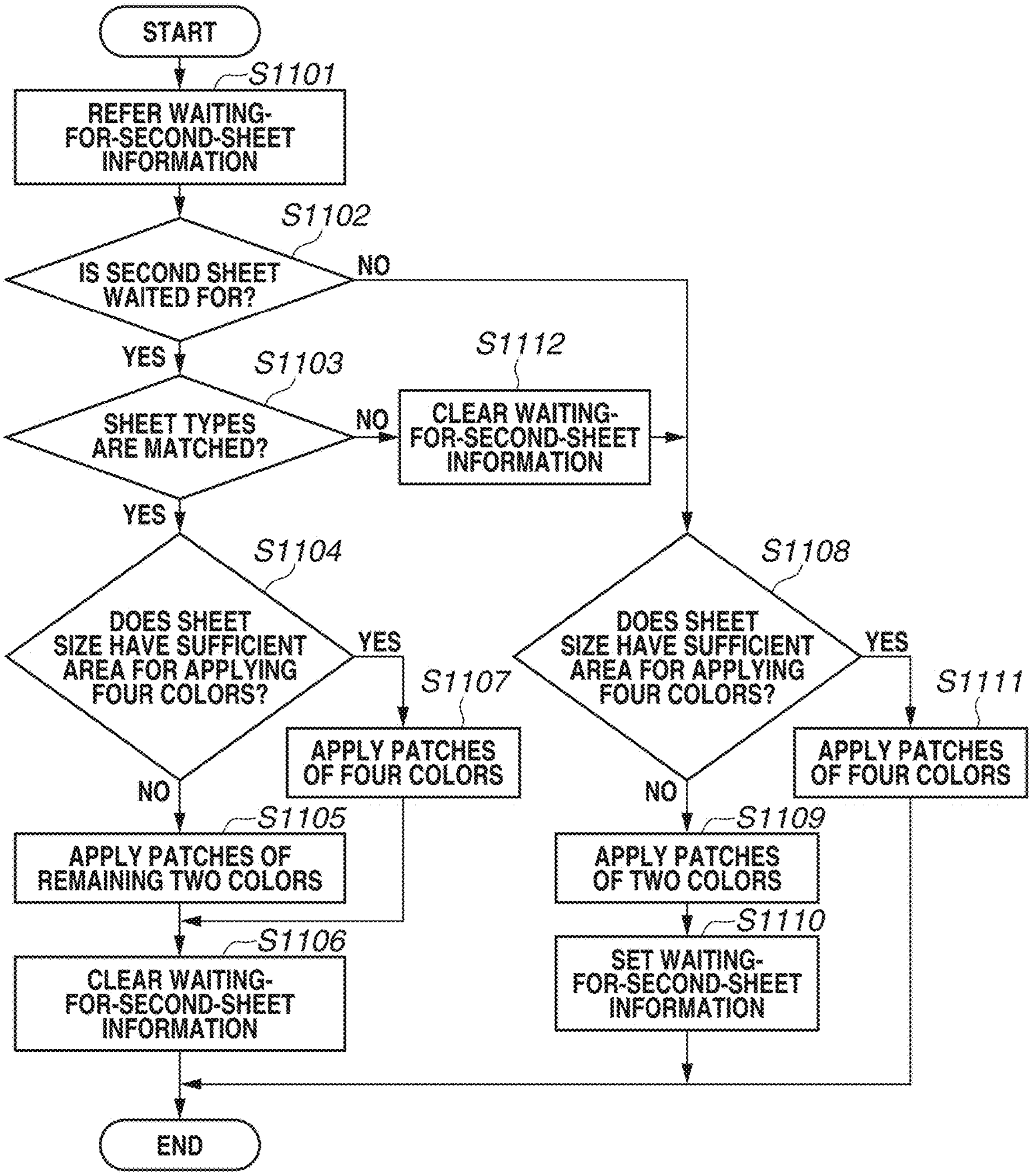
FIG. 11 is a flowchart illustrating a printing process for printing gradation patches according to a first exemplary embodiment.

First, with reference to FIG. 11, a description is given of a processing procedure in which the patches are combined. This processing is a detailed processing procedure executed at the timing when the patch combining unit 309 combines the patches in step S4018 in the sequence illustrated in FIG. 4B. A flowchart in FIG. 11 is achieved by the CPU 2101 of the image forming apparatus 101 loading a program stored in the ROM 2102 into the RAM 2103 and executing the program.

In step S1101, the patch combining unit 309 references waiting-for-second-sheet information as illustrated in FIG. 12A. The waiting-for-second-sheet information is information indicating a sheet type of a sheet on which patches of the first two colors for a sheet size having an insufficient area for applying the patches have been printed, and is waited for another sheet on which patches for the remaining two colors are to be printed. This information is initialized when the image forming apparatus 101 starts. In step S1102, the patch combining unit 309 determines whether a sheet type is registered in the waiting-for-second-sheet information. In a case where there is a sheet type in the waiting-for-second-sheet information (YES in step S1102), the processing proceeds to step S1103. In step S1103, the patch combining unit 309 determines whether there is a match between the sheet type received by the patch combining unit 309 from the image generation unit 307 in step S4017 in FIG. 4B and the sheet type registered in the waiting-for-second-sheet information. In a case where the sheet types match each other (YES in step S1103), the processing proceeds to step S1104. In step S1104, the patch combining unit 309 determines whether the sheet size received by the patch combining unit 309 from the image generation unit 307 in step S4017 in FIG. 4B has a sheet size having a sufficient area for applying the patches of the four colors. In a case where the patch combining unit 309 determines that the sheet size has an insufficient area for applying the patches of the four colors (NO in step S1104), the processing proceeds to step S1105. In step S1105, the patch combining unit 309 combines patches of two colors (922 and 923) to be applied to the second page of the sheet size having an insufficient area for applying the patches with the margin of the print image transferred from the image generation unit 307, as illustrated in FIG. 9B. Then, the processing proceeds to step S1106. In step S1106, the patch combining unit 309 deletes the sheet type of the sheet on which the patches are combined in step S1105 from the waiting-for-second-sheet information. In a case where the patch combining unit 309 determines in step S1104 that the sheet size has a sufficient area for applying the patches of the four colors (YES in step S1104), the processing proceeds to step S1107. In step S1107, the patch combining unit 309 combines the patches of the four colors (902, 903, 904, and 905) with the margin of the print image transferred from the image generation unit 307. In step S1106, the patch combining unit 309 deletes the sheet type of the sheet on which the patches are combined in step S1107 from the waiting-for-second-sheet information.

In a case where the patch combining unit 309 determines in step S1102 that a sheet type is not registered in the waiting-for-second-sheet information (NO in step S1102), the processing proceeds to step S1108. In step S1108, the patch combining unit 309 determines whether the sheet size received by the patch combining unit 309 from the image generation unit 307 in step S4017 in FIG. 4B is a sheet size having a sufficient area for applying the patches of the four colors. In a case where the patch combining unit 309 determines that the sheet size has an insufficient area for applying the patches of the four colors (NO in step S1108), the processing proceeds to step S1109. In step S1109, as illustrated in FIG. 9B, the patch combining unit 309 combines patches of two colors (912 and 913) to be applied to the first page of the sheet size having an insufficient area for applying the patches with the margin of the print image transferred from the image generation unit 307. Then, the processing proceeds to step S1110. In step S1110, the patch combining unit 309 records the sheet type of the sheet on which the patches are combined in step S1109 in the waiting-for-second-sheet information.

In a case where the patch combining unit 309 determines in step S1108 that the sheet size has a sufficient area for applying the patches of the four colors (YES in step S1108), the processing proceeds to step S1111. In step S1111, the patch combining unit 309 combines the patches of the four colors (902, 903, 904, and 905) with the margin of the print image transferred from the image generation unit 307.

In a case where the patch combining unit 309 determines in step S1102 that a sheet type is registered in the waiting-for-second-sheet information (YES in step S1102), and further, in a case where the patch combining unit 309 determines in step S1103 that the sheet type registered in the waiting-for-second-sheet information does not match the sheet type received by the patch combining unit 309 from the image generation unit 307 in step S4017 in FIG. 4B (NO in step S1103), the processing proceeds to step S1112. In step S1112, the patch combining unit 309 clears the sheet type registered in the waiting-for-second-sheet information. Then, processes similar to those of steps S1108 to S1111 are performed.

Control is performed as described above, whereby, in a case where a sheet size has an insufficient area for applying the patches of the four colors and sheets of the same sheet type are conveyed in a row, the patches of the four colors are divided into groups of two colors to print the patches.

Although the process of performing color measurement on the patches combined according to the flowchart in FIG. 11 and calculating reference values and correction values is as described with reference to FIG. 6B, a partial supplementary description is given.

In a case where the patches are divided into groups of two colors for sheets in a sheet size having an insufficient area for applying the patches of the four colors, the color measurement sensor control unit 312 first notifies the reference information saving unit 311 of the color measurement results of the first two colors in step S621. The reference information saving unit 311 saves the color measurement results of the first two colors received by the reference information saving unit 311 in the color measurement result table for each sheet type in the temporary area,. However, since all the color measurement results of the four colors are not obtained, the subsequent processing is not executed. In a case where the next page has the same sheet size and the same sheet type, the reference information saving unit 311 is notified of the color measurement results of the remaining two colors by the color measurement sensor control unit 312 as the processing in step S621 for the subsequent page. Accordingly, all the color measurement results of the four colors are obtained, and the processing proceeds to step S623.

Meanwhile, even in a case where a sheet size has an insufficient area for applying the patches of the four colors but in a case where sheets of the same sheet type are not conveyed in a row, patches of the first two colors are printed, and then, patches of the remaining two colors are not printed. In this case, the color measurement results of the first two colors remain saved in the color measurement result table for the corresponding sheet type in the temporary area. In the color measurement result table for this sheet type, however, the reference information saving unit 311 overwrites the color measurement results received by the reference information saving unit 311 when the reference information saving unit 311 is notified of color measurement results for the same sheet type by the color measurement sensor control unit 312. Then, the reference information saving unit 311 waits for all the color measurement results of the four colors to be obtained. Since the above-described control is performed, it is possible to handle the combinations of the color measurement results of the four colors as intended and hold accurate correction values and reference values.

In the first exemplary embodiment, in a case where a sheet size has an insufficient area for applying the patches and two sheets of the same type are not conveyed in a row, the printing on the second page 920 in FIG. 9B is not performed. In this case, regarding this sheet type, although patches of the first two colors are printed on the first page (print sheet) 910 in FIG. 9B, adjustment is not performed because all the patches of the four colors are not obtained. However, depending on the print job with which the user instructs the image forming apparatus 101 to perform printing, a case is quite conceivable where a sheet size has an insufficient area for applying the patches and two sheets of the same type are not conveyed in a row. In response, in a second exemplary embodiment, in a case where a sheet size has an insufficient area for applying the patches and sheets of the same type are conveyed within a certain interval (within a predetermined number of sheets), the printing on the second page 920 in FIG. 9B is performed. To this end, in the image forming apparatus 101, taking the engine performance into account in advance, a threshold is designed for an output interval that, even in a case where the patches of the four colors as the basis of reference values or correction values for adjustment are divided into groups of two colors, enables the patches of the four colors to be treated as the same set. Then, the patches are printed according to the threshold.

Figure 13:
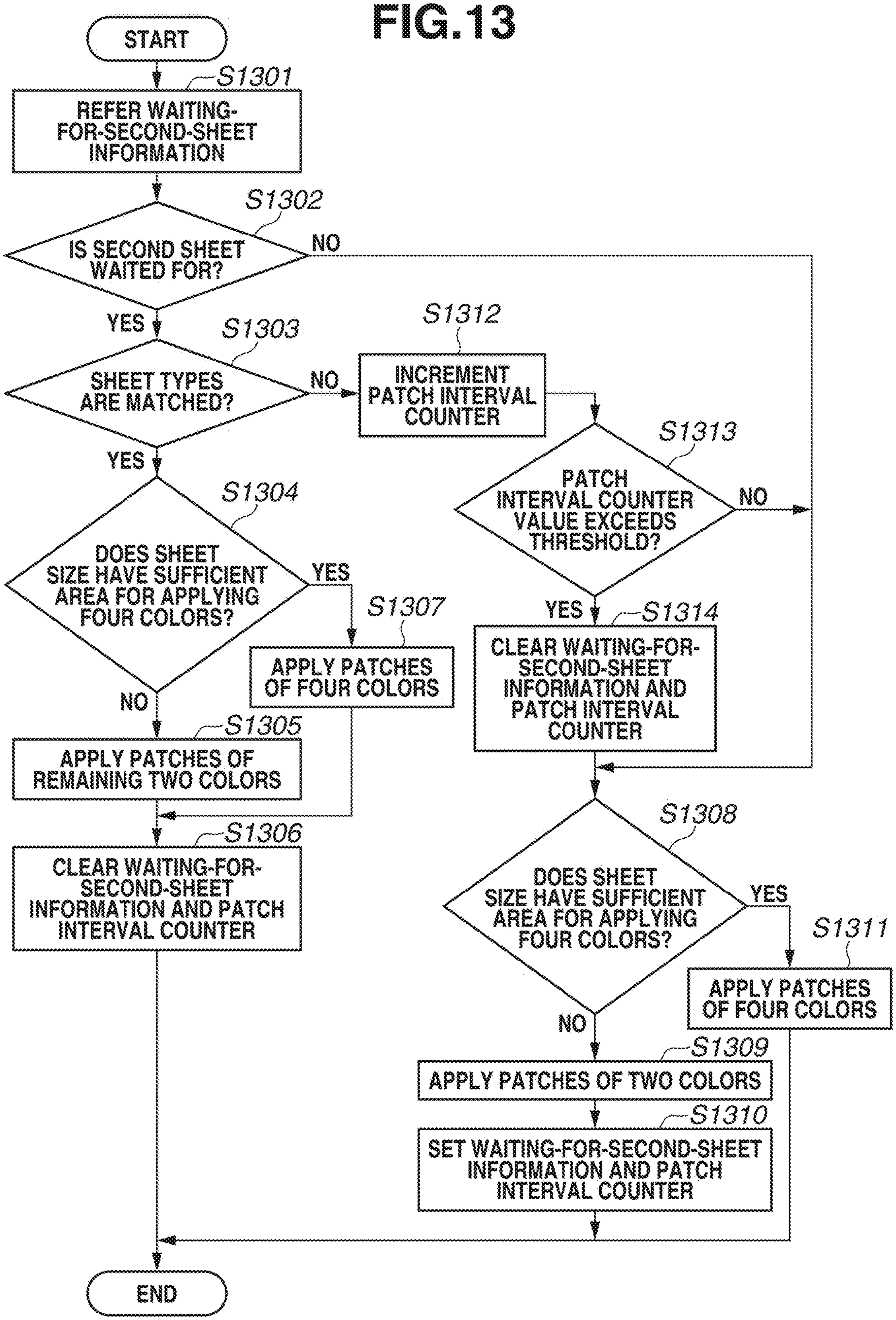
FIG. 13 is a flowchart illustrating a printing process for printing gradation patches according to the second exemplary embodiment.

The color measurement process is similar to that in the first exemplary embodiment. Thus, in the second exemplary embodiment, with reference to FIG. 13, a description is given of a processing procedure in which patches are combined. This processing is a detailed processing procedure executed at the timing when the patch combining unit 309 combines the patches in step S4018 in the sequence illustrated in FIG. 4B. A flowchart in FIG. 13 is achieved by the CPU 2101 of the image forming apparatus 101 loading a program stored in the ROM 2102 into the RAM 2103 and executing the program.

In step S1301, the patch combining unit 309 references waiting-for-second-sheet information as illustrated in FIG. 12B. The waiting-for-second-sheet information is information indicating a sheet type of a sheet on which patches of the first two colors based on a sheet size having an insufficient area for applying the patches have been printed, and is waited for another sheet on which patches of the subsequent two colors are to be printed, and a patch interval counter. This information is initialized when the image forming apparatus 101 starts. The patch interval counter counts a value that is counted up in a case where, after the printing on the first page 910 in FIG. 9B is performed, a sheet of the same sheet type does not follow, and a sheet of a type other than the same sheet type is printed. In step S1302, the patch combining unit 309 determines whether a sheet type is registered in the waiting-for-second-sheet information. In a case where there is a sheet type of the second sheet that is waited for (YES in step S1302), the processing proceeds to step S1303. In step S1303, the patch combining unit 309 determines whether there is a match between the sheet type received by the patch combining unit

309 from the image generation unit 307 in step S4017 in FIG. 4B and the sheet type registered in the waiting-for-second-sheet information. In a case where the sheet types match each other (YES in step S1303), the processing proceeds to step S1304. In step S1304, the patch combining unit 309 determines whether the sheet size received by the patch combining unit 309 from the image generation unit 307 in step S4017 in FIG. 4B is a sheet size having a sufficient area for applying the patches of the four colors. In a case where the patch combining unit 309 determines that the sheet size has an insufficient area for applying the patches of the four colors (NO in step S1304), the processing proceeds to step S1305. In step S1305, as illustrated in FIG. 9B, the patch combining unit 309 combines patches of two colors (922 and 923) to be applied to the second page of the sheet size having an insufficient area for applying the patches with the margin of the print image transferred from the image generation unit 307. Then, the processing proceeds to step S1306. In step S1306, the patch combining unit 309 clears information regarding the sheet type of the sheet on which the patches are combined in step S1305 and the patch interval counter in information recorded in the waiting-for-second-sheet information. In a case where the patch combining unit 309 determines in step S1304 that the sheet size has a sufficient area for applying the patches of the four colors (YES in step S1304), the processing proceeds to step S1307. In step S1307, the patch combining unit 309 combines the patches of the four colors (902, 903, 904, and 905) with the margin of the print image transferred from the image generation unit 307. Then, in step S1306, the patch combining unit 309 clears information regarding the sheet type of the sheet on which the patches are combined in step S1307 and the patch interval counter in information recorded in the waiting-for-second-sheet information.

In a case where the patch combining unit 309 determines in step S1302 that a sheet type is not registered in the waiting-for-second-sheet information (NO in step S1302), the processing proceeds to step S1308. In step S1308, the patch combining unit 309 determines whether the sheet size received by the patch combining unit 309 from the image generation unit 307 in step S4017 in FIG. 4B is a sheet size having a sufficient area for applying the patches of the four colors. In a case where the patch combining unit 309 determines that the sheet size has an insufficient area for applying the patches of the four colors (NO in step S1308), the processing proceeds to step S1309. In step S1309, as illustrated in FIG. 9B, the patch combining unit 309 combines patches of two colors (912 and 913) to be applied to the first page of the sheet size having an insufficient area for applying the patches with the margin of the print image transferred from the image generation unit 307. Then, the processing proceeds to step S1310. In step S1310, the patch combining unit 309 records in the waiting-for-second-sheet information the sheet type of the sheet on which the patches are combined in step S1309 and sets the patch interval counter of the sheet type to 0. In a case where the patch combining unit 309 determines in step S1308 that the sheet size has a sufficient area for applying the patches of the four colors (YES in step S1308), the processing proceeds to step S1311. In step S1311, the patch combining unit 309 combines the patches of the four colors (902, 903, 904, and 905) with the margin of the print image transferred from the image generation unit 307.

In a case where the patch combining unit 309 determines in step S1302 that a sheet type is registered in the waiting-for-second-sheet information (YES in step S1302), and in a case where the patch combining unit 309 determines in step S1303 that there is not a match between the sheet type registered in the waiting-for-second-sheet information and the sheet type received by the patch combining unit 309 from the image generation unit 307 in step S4017 in FIG. 4B (NO in step S1303), the processing proceeds to step S1312. In step S1312, the patch combining unit 309 increments the patch interval counter that is recorded in the waiting-for-second-sheet information and corresponds to the sheet type received by the patch combining unit 309 from the image generation unit 307 in step S4017 in FIG. 4B. Next, in step S1313, the patch combining unit 309 checks whether the value of the patch interval counter incremented in step S1312 exceeds the range of a threshold for an output interval acceptable by the image forming apparatus 101. In a case where the value of the patch interval counter is exceeds the acceptable range (YES in step S1313), the processing proceeds to step S1314. In step S1314, the patch combining unit 309 clears information regarding the sheet type received by the patch combining unit 309 from the image generation unit 307 in step S4017 in FIG. 4B and clears the patch interval counter in information recorded in the waiting-for-sheet information. Then, the processing proceeds to step S1308, and the processes of steps S1308 to S1311 are performed. In a case where the patch combining unit 309 determines in step S1313 that the value of the patch interval counter is within the acceptable range (NO in step S1313), the process of step S1314 is skipped, and the processing proceeds to steps S1308 to S1311.

Control is performed as described above, and therefore, as long as the value of the patch interval counter is within the threshold for the output interval determined in advance by the image forming apparatus 101, the patches of the four colors are divided into groups of two colors and printed even in a case where a sheet size has an insufficient area for applying the patches of the four colors and sheets of the same sheet type are not conveyed in a row.

According to the aspect of the embodiments, even in a case where gradation patches of a plurality of colors cannot be printed in a recording sheet, it is possible to perform gradation correction with high accuracy.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2019-235093, filed Dec. 25, 2019, which is hereby incorporated by reference herein in its entirety.

What is claimed is:

1. An image forming apparatus comprising:

a printer;

one or more controllers including one or more processors and one or more memories, the one or more controllers configured to:

control the printer to print a gradation patch image of a plurality of colors for gradation correction on a sheet of a specified sheet size;

control to read the gradation patch image printed on the sheet and perform color measurement on the gradation patch image;

generate gradation correction data of the plurality of colors based on a value obtained by the color measurement; and perform gradation correction on an image, using the generated gradation correction data, wherein the one or more controllers are configured to control the printer to print gradation patch images of a first color, a second color, a third color and a fourth color on a sheet of a first sheet size, and the one or more controllers are configured to control the printer to print the gradation patch images of the first color and the second color on a sheet of a second sheet size smaller than the first sheet size without printing gradation patch image of the third color and the fourth color on the sheet of the second sheet size, and to control the printer to print the gradation patch images of the third color and the fourth color on another sheet of the second sheet size different from the sheet of the second sheet size without printing the gradation patch images of the first color and the second color on the another sheet of the second sheet size.

2. The apparatus according to claim 1, wherein the sheets of the second sheet size and the another sheet size of the second sheet size are conveyed in series.

3. The apparatus according to claim 1, wherein in a case where the sheet of the second sheet size and the another sheet of the second sheet size are conveyed within a predetermined number of sheets, the one or more controllers are configured to control the printer to print the gradation patch images of the first color and the second color on a sheet of the second sheet size without printing the gradation patch images of the third color and the fourth color on the sheet of the second sheet size, and to control the printer to print the gradation patch images of the third color and the fourth color on the another sheet of the second sheet size without printing the gradation patch image of the first color and the second color on the another sheet of the second sheet size.

4. The apparatus according to claim 1, wherein the first color is cyan, the second color is black, the third color is yellow, and the fourth color is magenta.

5. The apparatus according to claim 1, wherein the gradation patch images of the first colors are gradation patch images having a plurality different of densities, the gradation patch images of the second color are gradation patch images having a plurality of different densities, the gradation patch images of the third color are gradation patch images having a plurality of different densities, the gradation patch images of the fourth color are gradation patch images having a plurality of different densities.

6. The apparatus according to claim 1, wherein the one or more controllers prints an image obtained by combining the gradation patch images of the first color and the second color within a margin of a print image.

7. The apparatus according to claim 1, wherein after the one of more controllers performs color measurement on the gradation patch images printed on the sheet and the another sheet of the second sheet size, the one or more controllers generates the gradation correction data.

8. An image forming method comprising:

printing a gradation patch images of a plurality of colors for gradation correction on a sheet of a specified sheet size;

reading the gradation patch images printed on the sheet and performing color measurement on the gradation patch image;

generating gradation correction data of the plurality of colors based on a value obtained by the color measurement; and performing gradation correction on an image, using the generated gradation correction data, wherein the printing comprsies printing gradation patch images of a first color, a second color, a third color and a fourth color on a sheet of a first sheet size printing gradation patch images of the first color and the second color on a sheet of a second sheet size smaller than the first sheet size without printing gradation patch images of the third color and the fourth color on the sheet of the second sheet size, and printing the gradation patch images of the third color and the fourth color on another sheet of the second sheet size different from the sheet of the second sheet size without printing the gradation patch images of the first color and the second color on the another sheet of the second sheet size.

9. The method according to claim 8, wherein the sheets of the second sheet size and another sheet size of the second sheet size are conveyed in series.

10. The method according to claim 8, wherein in a case where the sheets of the second size and the another sheet of the second sheet size are conveyed within a predetermined number of sheets, the printing comprises printing the gradation patch images of the first color and the second color on a sheet of the second sheet size without printing the gradation patch images of the third color and the fourth color on the sheet of the second sheet size, and printing the gradation patch images of the third color and the fourth color on the another sheet of the second sheet size without printing the gradation patch images of the first color and the second color on the another sheet of the second sheet size.

11. The method according to claim 8, wherein the first color is cyan, the second color is black, the third color is yellow, and the fourth color is magenta.

12. The method according to claim 8, wherein the gradation patch images of the first color are gradation patch images having a plurality of different densities, the gradation patch images of the second color are gradation patch images having a plurality of different densities, the gradation patch images of the third color are gradation patch images having a plurality of different densities, the gradation patch images of the fourth color are gradation patch images having a plurality of different densities.

13. The method according to claim 8, wherein the printing prints an image obtained by combining the gradation patch images of the first color and the second color within a margin of a print image.

14. The method according to claim 8, wherein after the performing performs color measurement on the gradation patch images printed on the sheet and the another sheet of the second sheet size, the generating generates the gradation correction data.

15. A non-transitory computer-readable memory storing a program for executing an image forming method, the method comprising:

printing a gradation patch image of the a plurality of colors for gradation correction on a sheet of a specified sheet size;

reading the gradation patch image printed on the sheet and performing color measurement on the gradation patch image;

generating gradation correction data of the plurality of colors based on a value obtained by the color measurement; and performing gradation correction on an image, using the generated gradation correction data, wherein the printing comprises printing gradation patch images of a first color, a second color, a third color and a fourth color on a sheet of a first sheet size printing gradation patch images of the first color and the second color on a sheet of a second sheet size smaller than the first sheet size without printing gradation patch image of the third color and the fourth color on the sheet of the second sheet size, and printing the gradation patch images of the third color and the fourth color on another sheet of the second sheet size different from the sheet of the second sheet size without printing the gradation patch images of the first color and the second color on the another sheet of the second sheet size.

* * * * *